United States Patent
Tonegawa

(10) Patent No.: US 9,516,013 B2
(45) Date of Patent: Dec. 6, 2016

(54) COMMUNICATION APPARATUS, METHOD OF CONTROLLING THE SAME AND STORAGE MEDIUM FOR TRANSMITTING IMAGE FILE TO A NETWORK ADDRESS

(71) Applicant: CANON KABUSHIKI KAISHA, Tokyo (JP)

(72) Inventor: Nobuyuki Tonegawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/067,488

(22) Filed: Oct. 30, 2013

(65) Prior Publication Data
US 2014/0161255 A1    Jun. 12, 2014

(30) Foreign Application Priority Data
Dec. 10, 2012 (JP) ................ 2012-269784

(51) Int. Cl.
*H04N 1/44* (2006.01)
*H04L 29/06* (2006.01)
*H04L 9/30* (2006.01)

(52) U.S. Cl.
CPC ....... *H04L 63/0823* (2013.01); *H04L 63/1416* (2013.01); *H04L 9/30* (2013.01)

(58) Field of Classification Search
CPC ............. H04L 9/3247; H04L 63/1416; H04L 63/0823; H04L 9/30; H04L 12/58; H04L 63/0428
USPC ........................................ 380/246
See application file for complete search history.

(56) References Cited

U.S. PATENT DOCUMENTS

| | | | |
|---|---|---|---|
| 5,905,783 A | 5/1999 | Tonegawa | 379/100.07 |
| 6,952,721 B2 | 10/2005 | Tonegawa | 709/206 |
| 7,394,560 B2 | 7/2008 | Tonegawa | 358/1.15 |
| 2005/0235040 A1 | 10/2005 | Tonegawa | 709/206 |
| 2006/0050303 A1 | 3/2006 | Oomori et al. | 358/1.15 |
| 2008/0056355 A1 | 3/2008 | Guo et al. | 375/240.012 |
| 2008/0256355 A1* | 10/2008 | Takemoto | 713/153 |
| 2009/0198997 A1* | 8/2009 | Yeap | H04L 51/28 713/155 |
| 2010/0124226 A1 | 5/2010 | Matsuda | 370/390 |
| 2013/0229694 A1 | 9/2013 | Tonegawa | 358/426.01 |

FOREIGN PATENT DOCUMENTS

| | | |
|---|---|---|
| CN | 1492316 | 4/2004 |
| CN | 101420430 | 4/2009 |
| JP | 2002-190891 | 5/2002 |
| JP | 2002-190796 | 7/2002 |
| JP | 2008-112431 | 5/2008 |
| JP | 2008-165307 | 7/2008 |
| JP | 2008-263331 | 10/2008 |
| JP | 2010-0118993 | 5/2010 |

OTHER PUBLICATIONS

Counterpart office action, Japanese Application No. 2012-269784, dated Jul. 15, 2016.
Counterpart office action, Japanese Application No. 2012269784, dated Sep. 26, 2016.

* cited by examiner

*Primary Examiner* — David García Cervetti
*Assistant Examiner* — Amie C Lin
(74) *Attorney, Agent, or Firm* — Fitzpatrick, Cella, Harper & Scinto

(57) ABSTRACT

Disclosed are a communication apparatus and a method of controlling the same. The communication apparatus sets, if it is designated to perform encrypted transmission, whether to not perform transmission to an address with respect to which encrypted transmission is not possible or to perform plain text transmission to the address, and an address is selected in a state where this setting has been configured. The communication apparatus determines whether or not the selected address is an address with respect to which the encrypted transmission is possible, and, if the result of the determination shows that the selected address is not the address with respect to which the encrypted transmission is possible, controls whether to not perform transmission to the selected address or to perform plain text transmission to the selected address, in accordance with the setting.

11 Claims, 19 Drawing Sheets

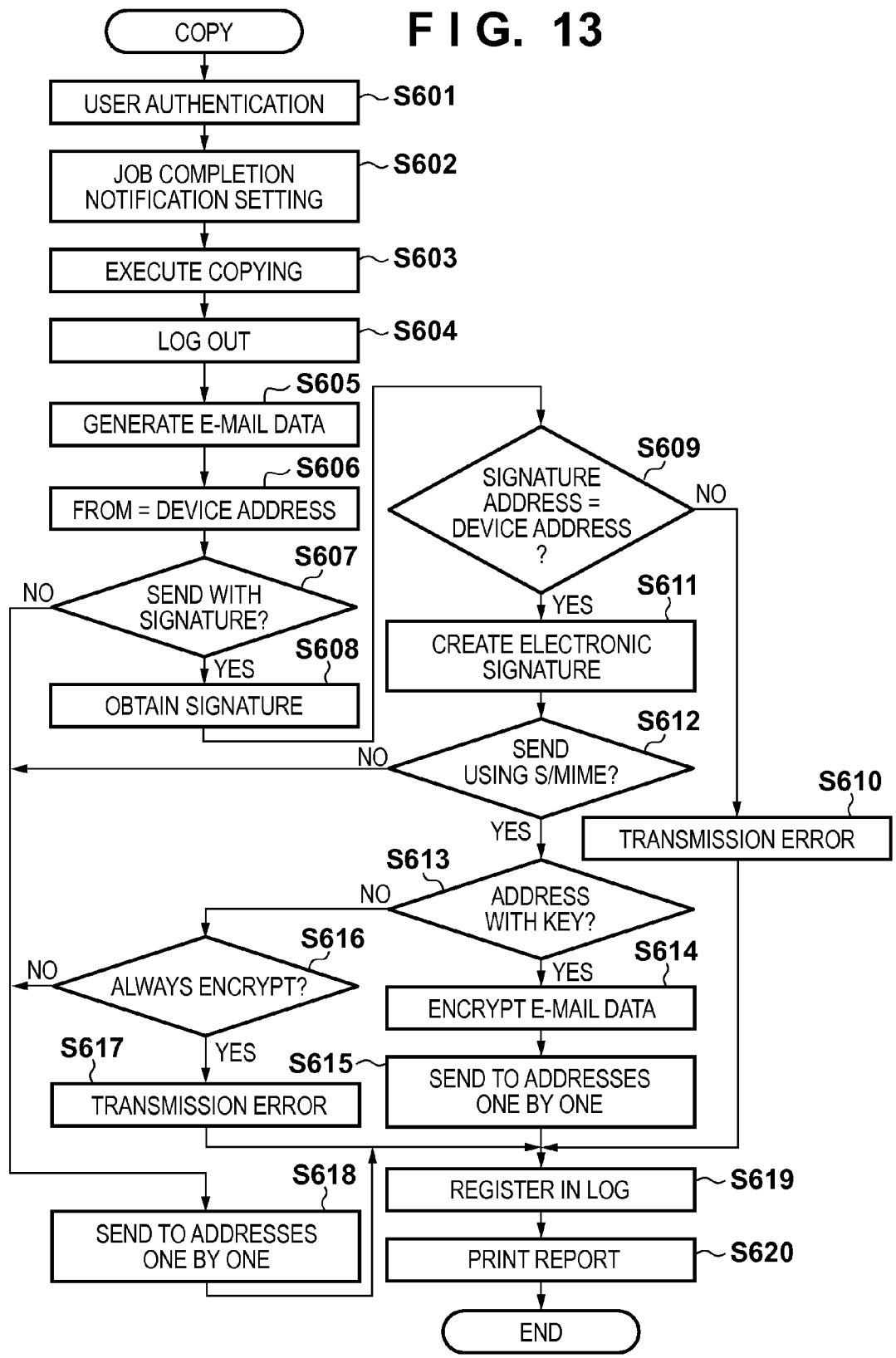
F I G. 13

F I G. 14
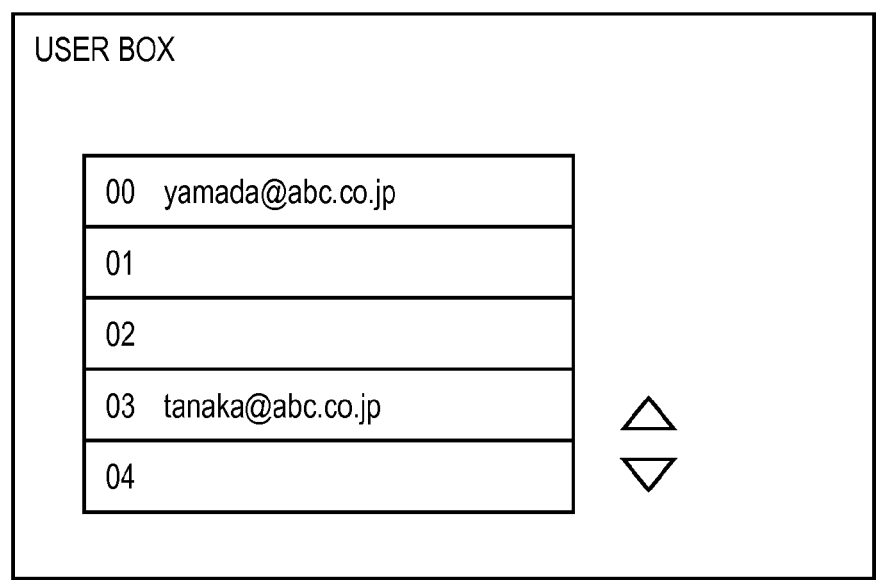

COMMUNICATION APPARATUS, METHOD OF CONTROLLING THE SAME AND STORAGE MEDIUM FOR TRANSMITTING IMAGE FILE TO A NETWORK ADDRESS

BACKGROUND OF THE INVENTION

Field of the Invention

The present invention relates to a communication apparatus that transmits an image file to an address on a network, a method of controlling the same, and a storage medium.

Description of the Related Art

S/MIME (Secure/Multipurpose Internet Mail Extensions) defined by RFC 2311 exists as a technology for improving electronic mail (e-mail) security. By using such a technology, encryption of e-mail data can be realized.

Internet facsimile apparatuses that attach image data read by a scanner to an e-mail and perform communication are also widely used, and a technology using S/MIME such as disclosed in Japanese Patent Laid-Open No. 2002-190891 also exists.

FIG. 18 is a diagram illustrating operations performed when one e-mail is broadcast to two addresses, namely, an address A and an address B.

A certificate 900 of a sender is encrypted using a secret key 901 of the sender to create a digest, and an electronic signature 902 is created together with public key information and the like. E-mail data 903 is encrypted using a common key 904 so that encrypted e-mail data 905 is generated.

Also, the common key 904 is encrypted using a public key 909 of a recipient A so that recipient A information 906 is created, and the common key 904 is encrypted using a public key 907 of a recipient B so that recipient B information 908 is created. The electronic signature 902, the encrypted e-mail data 905, the recipient A information 906, and the recipient B information 908 that were created in such a manner are converted into PKCS#7 format and sent.

S/MIME is not necessarily fully promulgated since management and operation of the keys are complicated. Accordingly, when one e-mail is broadcast to a plurality of addresses, not all the addresses necessarily support S/MIME. Also, depending on the importance of an e-mail or the network environment, there are cases where non-encrypted plain text data is transmitted to an address that does not support S/MIME without problem.

When, as described above, the plurality of addresses to which an e-mail is broadcast include an address that does not support S/MIME, a key encrypted using a public key of a recipient cannot be attached to that address. Therefore, even when the e-mail is received, the recipient can neither decode encrypted data in the e-mail nor check the content thereof. This is a significant problem particularly in a simple mode of an internet facsimile (IFAX) that does not enable a sender to be informed of the occurrence of an error.

Even in the case where an e-mail is transmitted while designating some of a plurality of destination addresses as Bcc (blind carbon copy), information on the recipient needs to be added to the transmission data, thus causing a problem in that information on recipients having a Bcc address is also disclosed.

SUMMARY OF THE INVENTION

An aspect of the present invention is to eliminate the above-mentioned problems which are found in the conventional technology.

A feature of the present invention is to provide a technique that can prevent the above-described problems from occurring, even in the case where multi-address transmission is performed in an environment including both addresses with respect to which encrypted transmission is possible and addresses with respect to which encrypted transmission is not possible.

According to an aspect of the present invention, there is provided a communication apparatus comprising:

a designation unit configured to designate whether to perform encrypted transmission or plain text transmission;

a setting unit configured to set, if it is designated by the designation unit to perform the encrypted transmission, whether to not perform transmission to an address with respect to which the encrypted transmission is not possible or to perform the plain text transmission to the address;

a selection unit configured to select an address in a state where the setting unit has configured the setting;

a determination unit configured to determine whether or not the address selected by the selection unit is an address with respect to which the encrypted transmission is possible; and a control unit configured to control, if a result of the determination by the determination unit shows that the address selected by the selection unit is not the address with respect to which the encrypted transmission is possible, whether to not perform transmission to the selected address or to perform the plain text transmission to the selected address, in accordance with the setting by the setting unit.

According to an aspect of the present invention, there is provided a method of controlling a communication apparatus, comprising:

designating whether to perform encrypted transmission or plain text transmission;

setting, if it is designated in the designating to perform the encrypted transmission, whether to not perform transmission to an address with respect to which the encrypted transmission is not possible or to perform the plain text transmission to the address;

selecting an address in a state where the setting has been performed;

determining whether or not the address selected in the selecting is an address with respect to which the encrypted transmission is possible; and controlling, if a result of the determination in the determining shows that the address selected in the selecting is not the address with respect to which the encrypted transmission is possible, whether to not perform transmission to the selected address or to perform plain text transmission to the selected address, in accordance with setting in the setting.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 13 is a flowchart for describing processing in which the MFP according to the first embodiment executes copy processing and, upon completion of this copy processing, sends a job completion notification via e-mail.

FIG. 14 is a diagram illustrating an example of settings of a user box in the MFP according to the first embodiment when image data obtained by being read by the scanner is stored in the user box.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that although the following embodiments describe a communication apparatus according to the present invention taking a multi function peripheral (MFP) as an example, the communication apparatus of the present invention is not limited to such a multi function peripheral (MFP), which is an image forming apparatus.

Figure 1:
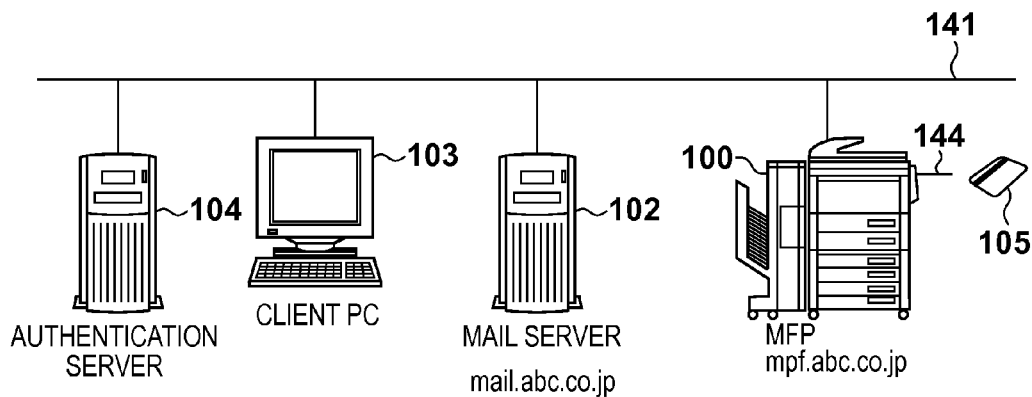
FIG. 1 is a diagram illustrating a configuration of an image communication system including a multi function peripheral (MFP) according to a first embodiment of the present invention.

FIG. 1 is a diagram illustrating a configuration of an image communication system including a multi function peripheral (MFP) according to a first embodiment of the present invention.

An MFP (Multi Function Peripheral) 100 has functions such as a copy function, a FAX function, a printer function, and the like, and the printer function is realized by a photoelectric printer engine. The MFP 100 also has a SEND function for sending an image file including image data obtained by being read by a scanner to a computer device, and an IFAX function for communicating the image data obtained by being read by the scanner with a device of the same type and for printing the received image data.

In this system, the MFP 100, a mail server 102, a client PC 103, and an authentication server 104 are connected to each other via a network 141. The mail server 102 can communicate with the MFP 100, the client PC 103, and the like using SMTP or POPS protocol, and can deliver an e-mail to which an image file is attached.

The client PC 103, on which image viewer software is installed, can display image data scanned by the MFP 100 and the image data can be printed using the printer function of the MFP 100. The client PC 103, on which e-mail client software is also installed, can send and receive e-mails to and from the mail server 102. The authentication server 104 is an authentication server such as Active Directory or the like that manages the devices connected to the network 141 as its own domain. A user who this authentication server 104 cannot authenticate is not able to log in the device in this domain. A card reader 144 is connected to the MFP 100 via a serial signal line and configured to read card information. Information stored in a card 105 is read by the card reader 144, and the information is used for authentication of a user who holds this card 105.

Figure 2:
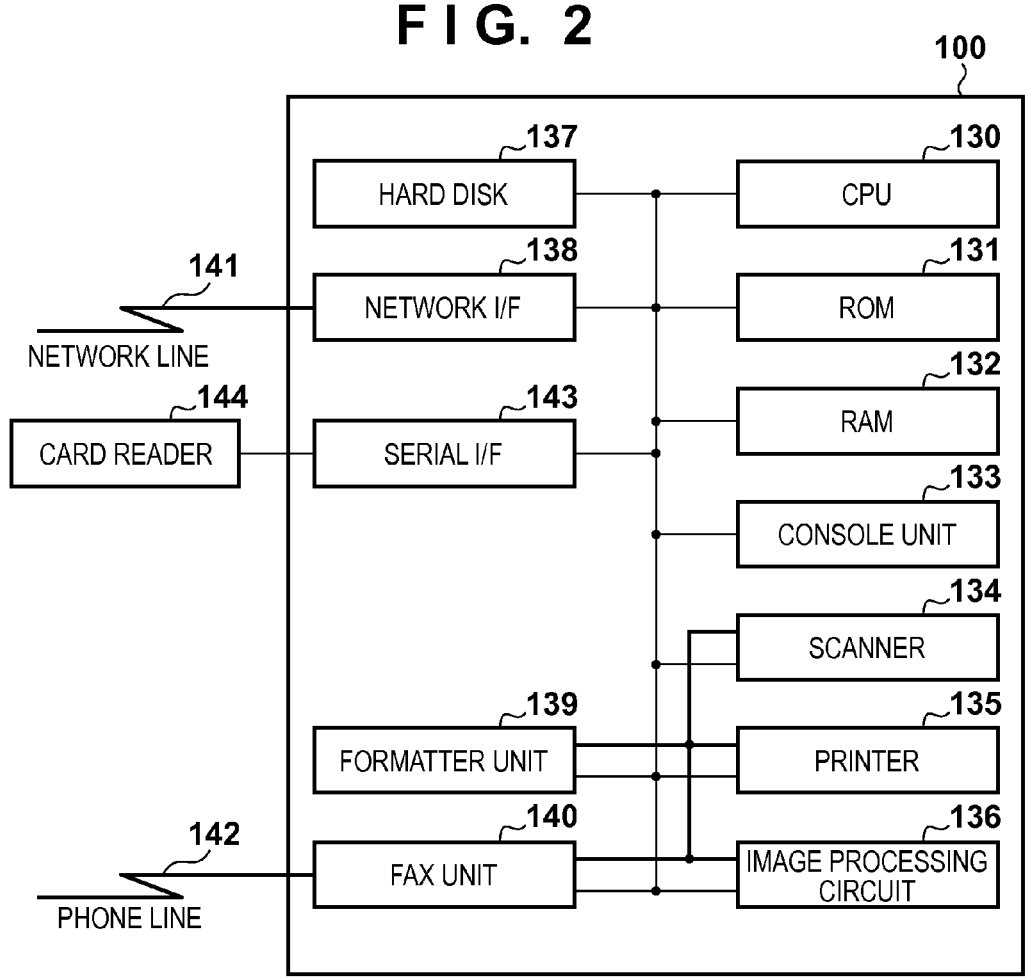
FIG. 2 is a block diagram illustrating a configuration of the MFP according to the first embodiment.

FIG. 2 is a block diagram illustrating a configuration of the MFP 100 according to the first embodiment.

In FIG. 2, a CPU 130 uses a RAM 132 and a program stored in a ROM 131 to control the entire MFP 100. A console unit 133 is provided with a display panel and hard keys such as a start key and a numeric keypad, and displays soft buttons on the display panel. The user can operate the MFP 100 by touching these buttons with his or her fingers or the like. The scanner 134 reads an image on a document and generates image data. A printer 135 prints the image based on the image data onto a recording medium. An image processing circuit 136 includes a large capacity image memory, an image rotation circuit, a scaling circuit, a coding/decoding circuit for coding systems such as MH, MR, MMR, JBIG, and JPEG, and the like, and can execute various types of image processing such as shading, trimming, and masking.

A hard disk 137 is a large capacity recording medium that is connected via an interface (I/F) such as SCSI and IDE. A network I/F 138 is a circuit for connecting to the Ethernet (registered trademark) represented by 10BASE-T, 100BASE-T, or the like, or to the network 141 such as a token ring. A formatter unit 139 is a rendering circuit for generating image data that is to be printed by the printer 135.

A fax unit 140 performs G3 FAX transmission and reception by making a connection to a phone line 142. A serial I/F 143 is a serial I/F such as RS232C, and serves as an I/F for connecting an external serial communication device to the MFP 100. The card reader 144 is connected to the serial I/F 143 so as to read information stored in the card 105 and input the read information. Based on this information, authentication of the user who is a card holder is executed.

Operations of the MFP 100 based on the above-described configuration will briefly be described.

When Page Description Language (PDL) data is received from the client PC 103 via the network I/F 138, the formatter unit 139 generates image data based on the received PDL data. Then, the generated image data is subjected to image processing by the image processing circuit 136 and printed by the printer 135. The scanner 134, the printer 135, the image processing circuit 136, and the formatter unit 139 are connected to each other via a high-speed video bus that is different from a CPU bus from the CPU 130, and are configured to be able to transfer the image data at high speed.

The MFP 100 realizes the copy function by causing the image processing circuit 136 to subject the image data obtained by the scanner 134 reading a document to image processing and by causing the printer 135 to print the image data subjected to image processing. Further, the MFP 100 can execute facsimile transmission by causing the image processing circuit 136 to subject the image data obtained by the scanner 134 reading a document to image processing and by causing the fax unit 140 to transmit the image data to an external device via the phone line 142. The MFP 100 can also execute facsimile reception in which data is received from the external device via the phone line 142, subjected to image processing by the image processing circuit 136, and printed by the printer 135.

Further, based on the image data obtained by the scanner 134 reading a document, the image processing circuit 136 generates an image file such as a JPEG, PDF, or TIFF file. Also, the SEND function can be executed for sending the generated image file with a communication protocol, such as SMTP, FTP, or SMB, via the network I/F 138. This SEND function is classified into file transmission, e-mail transmission, internet facsimile (IFAX) transmission, and FAX transmission. Generally, the e-mail transmission refers to a function for transmitting an image file such as JPEG, PDF, or TIFF with the SMTP protocol. The file transmission refers to a function for transmitting such an image file with FTP, SMB, or WebDAV. In an IFAX transmission mode, the facsimile function is realized by sending and receiving e-mails to each of which an image file defined by RFC 2305 is attached between the same types of devices. In this IFAX transmission mode, image data obtained by the scanner 134 reading a document is processed by the image processing circuit 136, a TIFF file defined by RFC 3949 is created based on the image data, and the created TIFF file is transmitted with a SMTP protocol. Also, it is also possible to receive an e-mail using a SMTP or POPS function, convert the received e-mail by the image processing circuit 136 into an image in a predetermined format, and then print the image by the printer 135.

Figure 3:
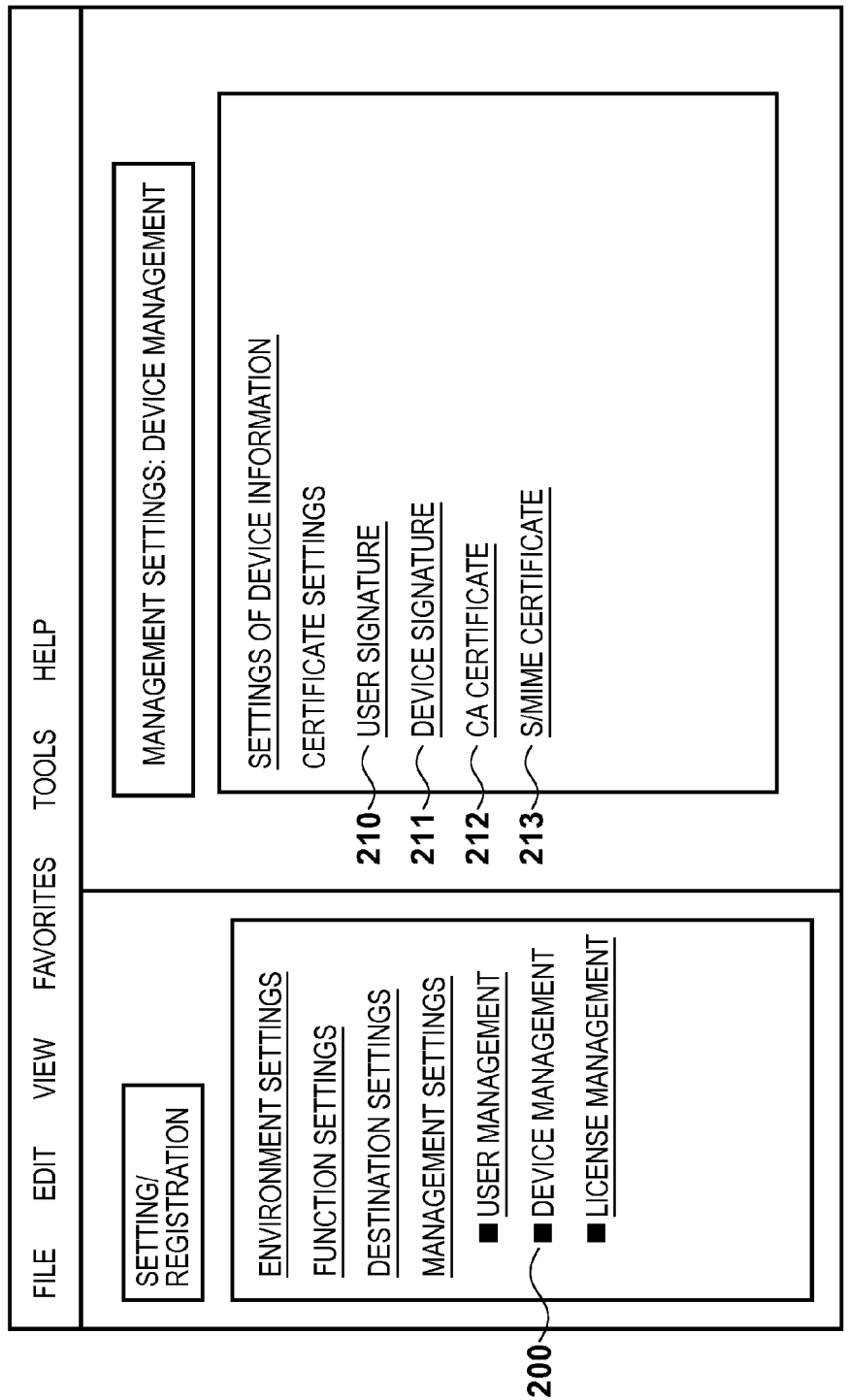
FIG. 3 is a diagram illustrating an example of a screen on which a user browses information on settings of the MFP using a browser that is installed in a client PC according to the first embodiment.

FIG. 3 is a diagram illustrating an example of a screen on which a user browses information on settings of the MFP 100 using a browser that is installed in the client PC 103 according to the first embodiment.

Here, device management 200 is selected from various types of setting information and, on the right side of the device management 200, a screen for device information settings of the device management is displayed. By clicking any of the underlined portions of FIG. 3, it is possible to shift a detailed screen of the corresponding setting.

Certificates of this MFP 100 include a user signature 210, a device signature 211, a CA certificate 212, and an S/MIME certificate 213.

Figure 4:
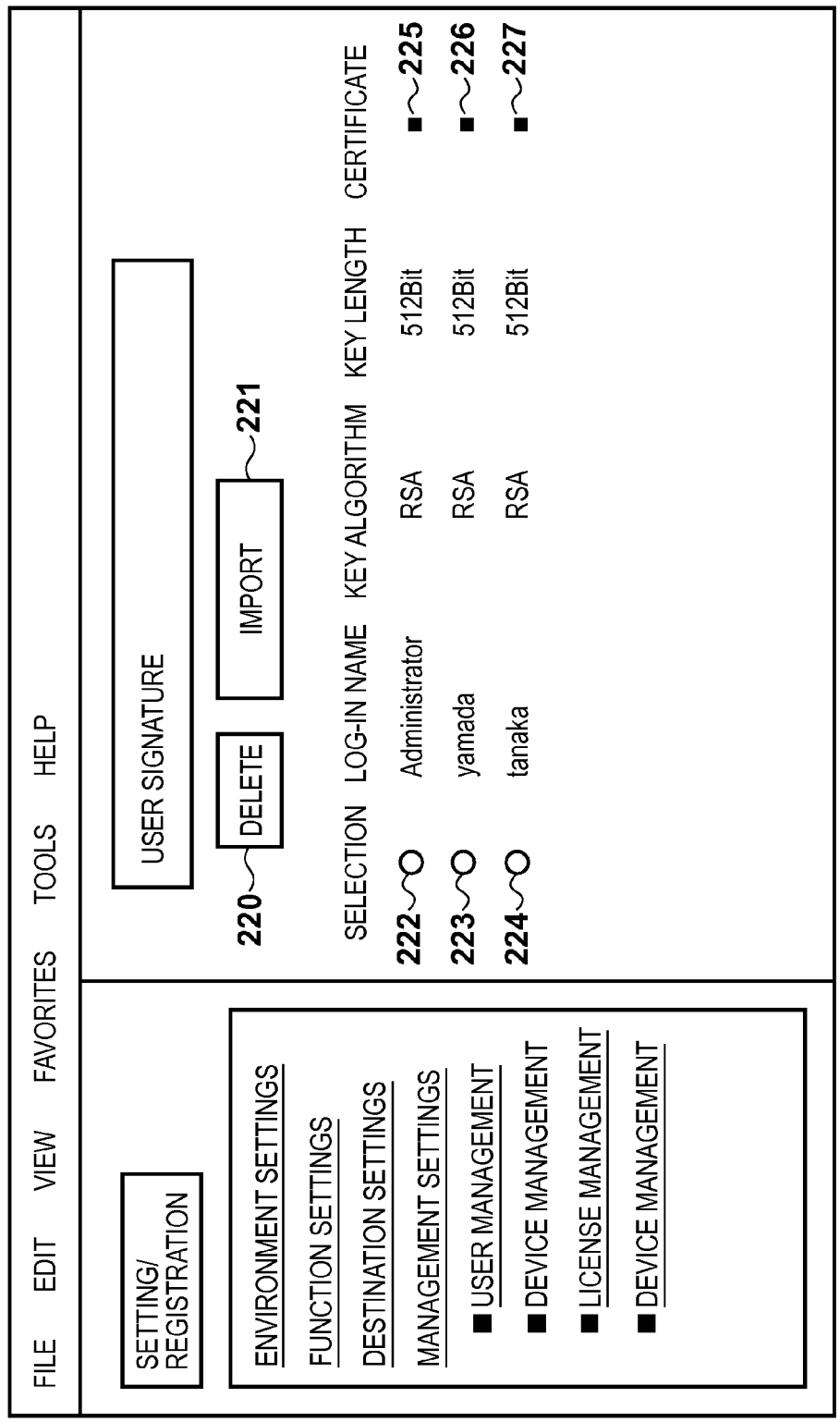
FIG. 4 is a diagram illustrating an example of a screen for setting/registering a user signature when "user signature" on the screen of FIG. 3 has been clicked.

FIG. 4 is a diagram illustrating an example of a screen for setting/registering a "user signature" when the user signature 210 on the screen of FIG. 3 has been clicked.

User signatures of three users, that is, Administrator, Yamada, and Tanaka are registered in the hard disk 137 of the MFP 100, and a key algorithm and a key length for each user are displayed. Here, when one of icons 225 to 227 is clicked, the detail of the certificate corresponding to this icon is displayed. Also, when one of radio buttons 222 to 224 is selected and a delete button 220 is clicked, the selected certificate is deleted. An import button 221 is a button for instructing to import the certificate of the user signature.

Figure 5:
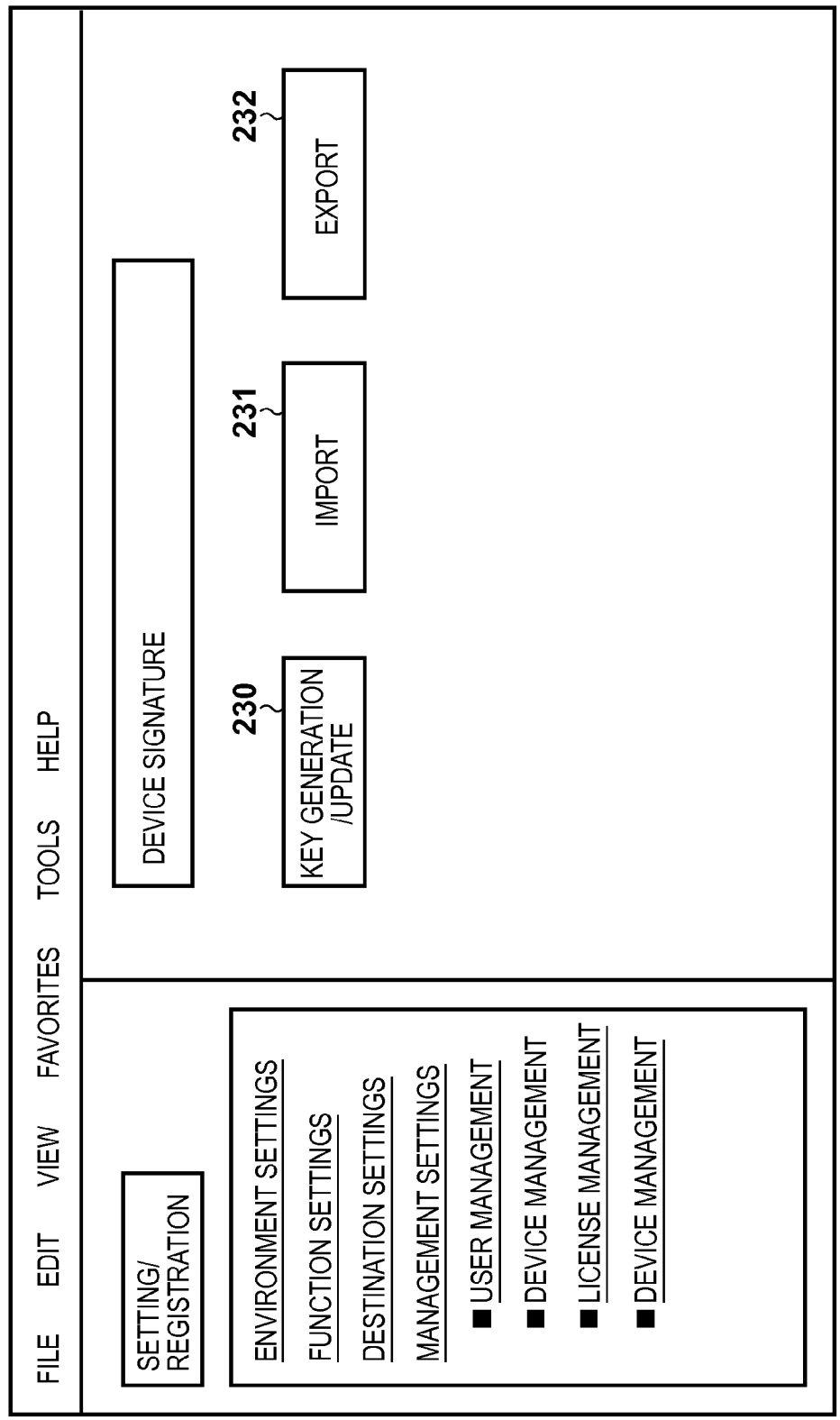
FIG. 5 is a diagram illustrating an example of a screen for setting/registering a device signature when "device signature" on the screen of FIG. 3 has been clicked.

FIG. 5 is a diagram illustrating an example of a screen for setting/registering a "device signature" when the device signature 211 on the screen of FIG. 3 has been clicked.

If a key generation/update button 230 on this screen is clicked, a key is generated and registered in the hard disk 137 within the MFP 100. Also, if an import button 231 is clicked, a certificate key in PKCS#12 format can be imported into the hard disk 137 from a designated position. Also, if an export button 232 is clicked, the certificate key in the PKCS#12 format can be stored in the designated position.

Figure 6:
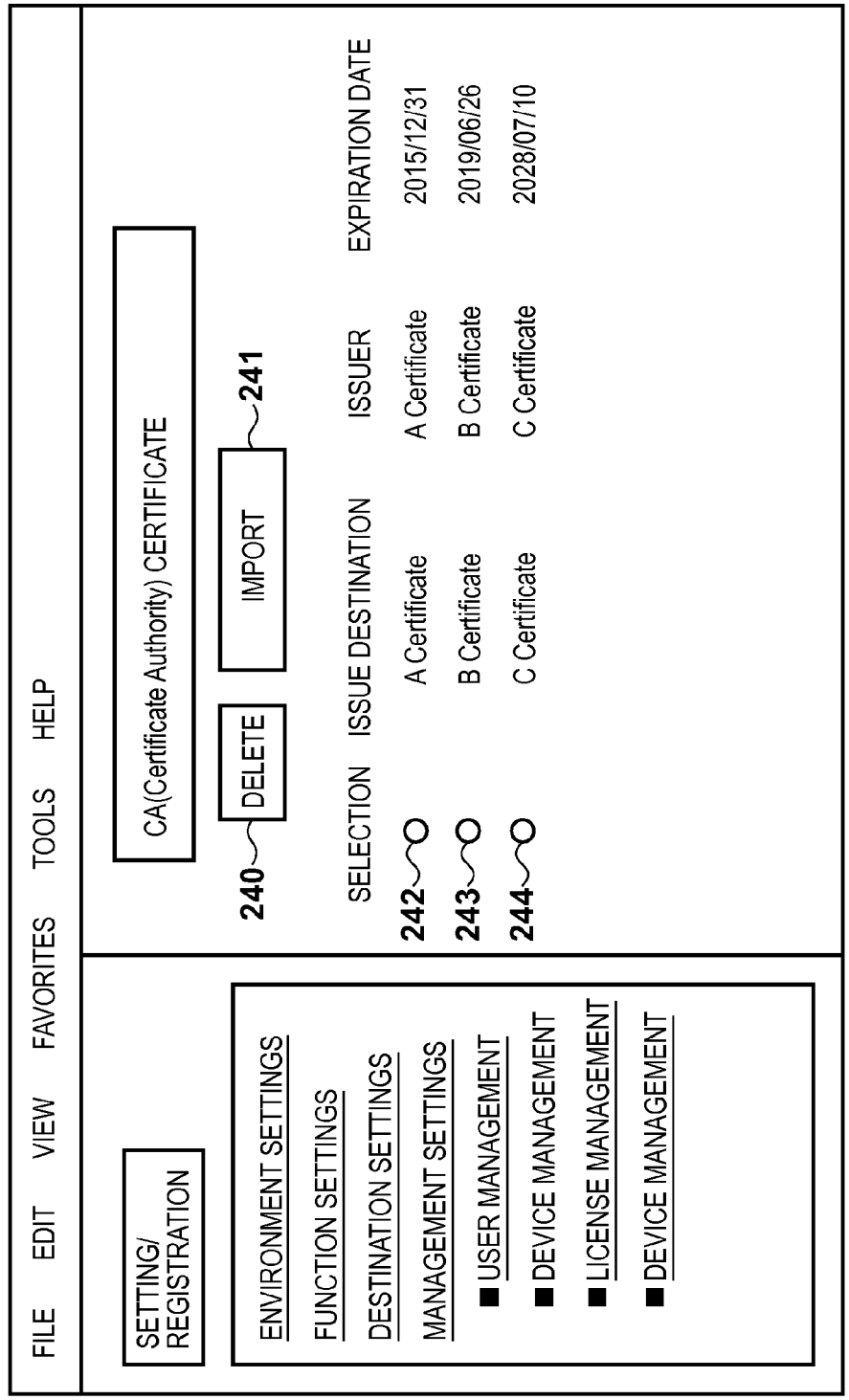
FIG. 6 is a diagram illustrating an example of a screen for setting/registering a Certificate Authority (CA) certificate when "CA certificate" on the screen of FIG. 3 has been clicked.

FIG. 6 is a diagram illustrating an example of a screen for setting/registering a "Certificate Authority (CA) certificate" when the CA certificate 212 on the screen of FIG. 3 has been clicked.

FIG. 6 shows that three certificates issued by A Certificate, B Certificate, and C Certificate are installed, and an issue destination, an issuer, and an expiration date are displayed for each certificate. Here, when any one of radio buttons 242 to 244 is selected and a delete button 240 is clicked, the selected CA certificate on the hard disk 137 is deleted. When an import button 241 is clicked, the certificate key in the PKCS#12 format can be imported into the hard disk 137 from the designated position. Here, the imported certificate is used for SSL communication and the like.

Figure 7:
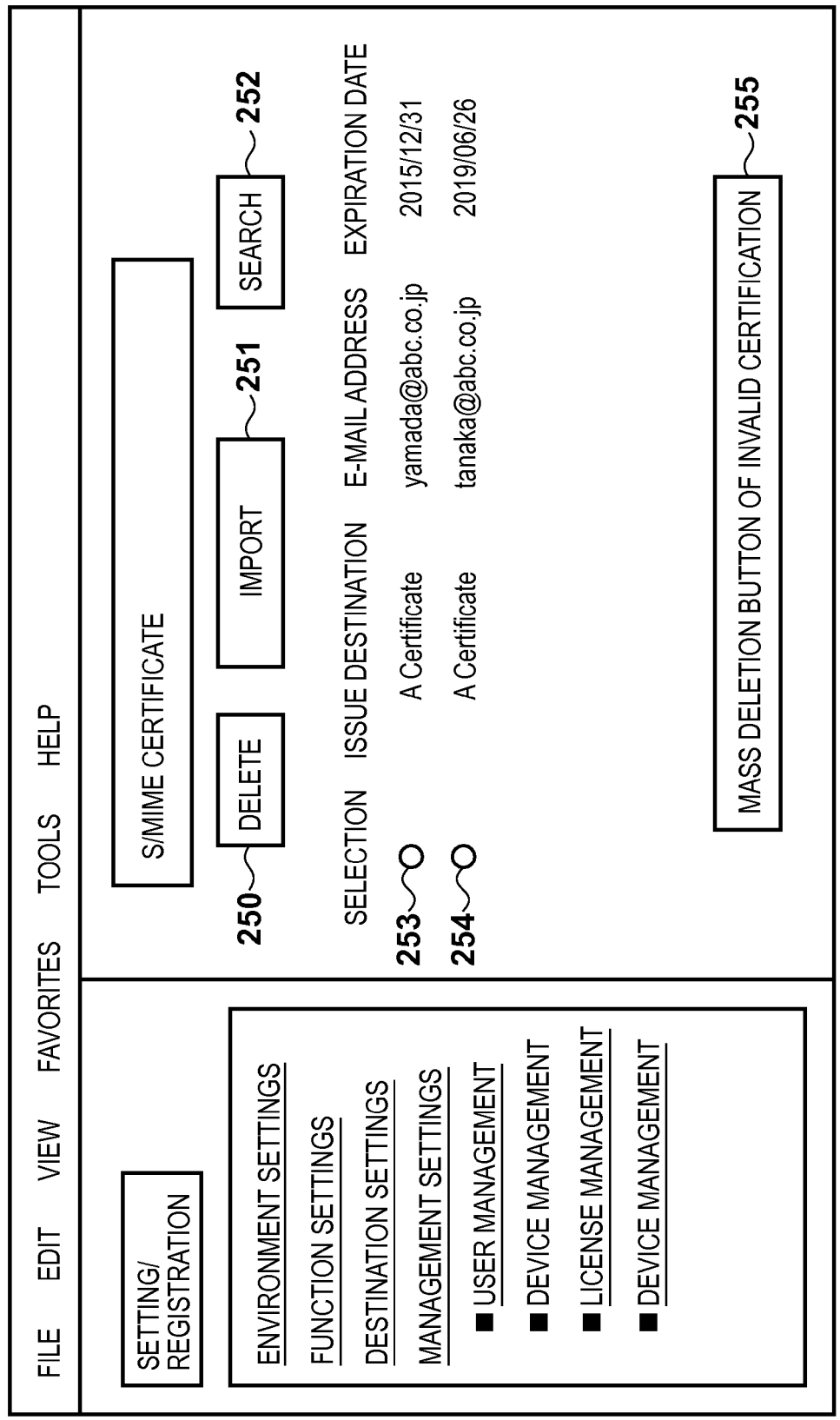
FIG. 7 is a diagram illustrating an example of a screen for setting/registering an S/MIME certificate when "S/MIME certificate" on the screen of FIG. 3 has been clicked.

FIG. 7 is a diagram illustrating an example of a screen for setting/registering an "S/MIME certificate" when the S/MIME certificate 213 on the screen of FIG. 3 has been clicked.

Here, up to 2000 certificates in X.509 format can be managed. In FIG. 7, certificates whose mail addresses are "yamada@abc.co.jp" and "tanaka@abc.co.jp" are registered, and an issuer, an e-mail address, and an expiration date for each certificate are displayed. Here, when a radio button 253 or 254 is selected and a delete button 250 is clicked, the selected certificate is deleted from the hard disk 137. Also, when an import button 251 is clicked, a certificate key in the X.509 format can be imported into the hard disk 137 from the designated position. Further, when a search key 252 is clicked, a certificate can be searched for with the use of information such as an e-mail address, an expiration date, and an issuer.

In the first embodiment, since up to 2000 S/MIME certificates, which are certificates of recipients, can be stored, it is difficult to find a certificate whose expiration date has expired and for which a revocation certificate has been issued. Also, if the certificate whose expiration date has expired is left as it is, it takes a long time for searching for a certificate at the time of transmission, resulting in a long transmission time period. Also, since it is not easy to search for and delete such a certificate, the number of unnecessary registered certificates increases, which causes a situation in which the number of certificates to be registered, that is, up to 2000, for example, is not sufficient. Therefore, a mass deletion button 255 of invalid certification is provided. When this button 255 is clicked, invalid certificates including certificates whose expiration date has expired, certificates for which a revocation certificate has issued, and the like can be deleted all together. Accordingly, it is possible to solve the problem that it takes a long time for transmission, the problem that the number of certificates to be registered is not sufficient, and the like.

Figure 8:
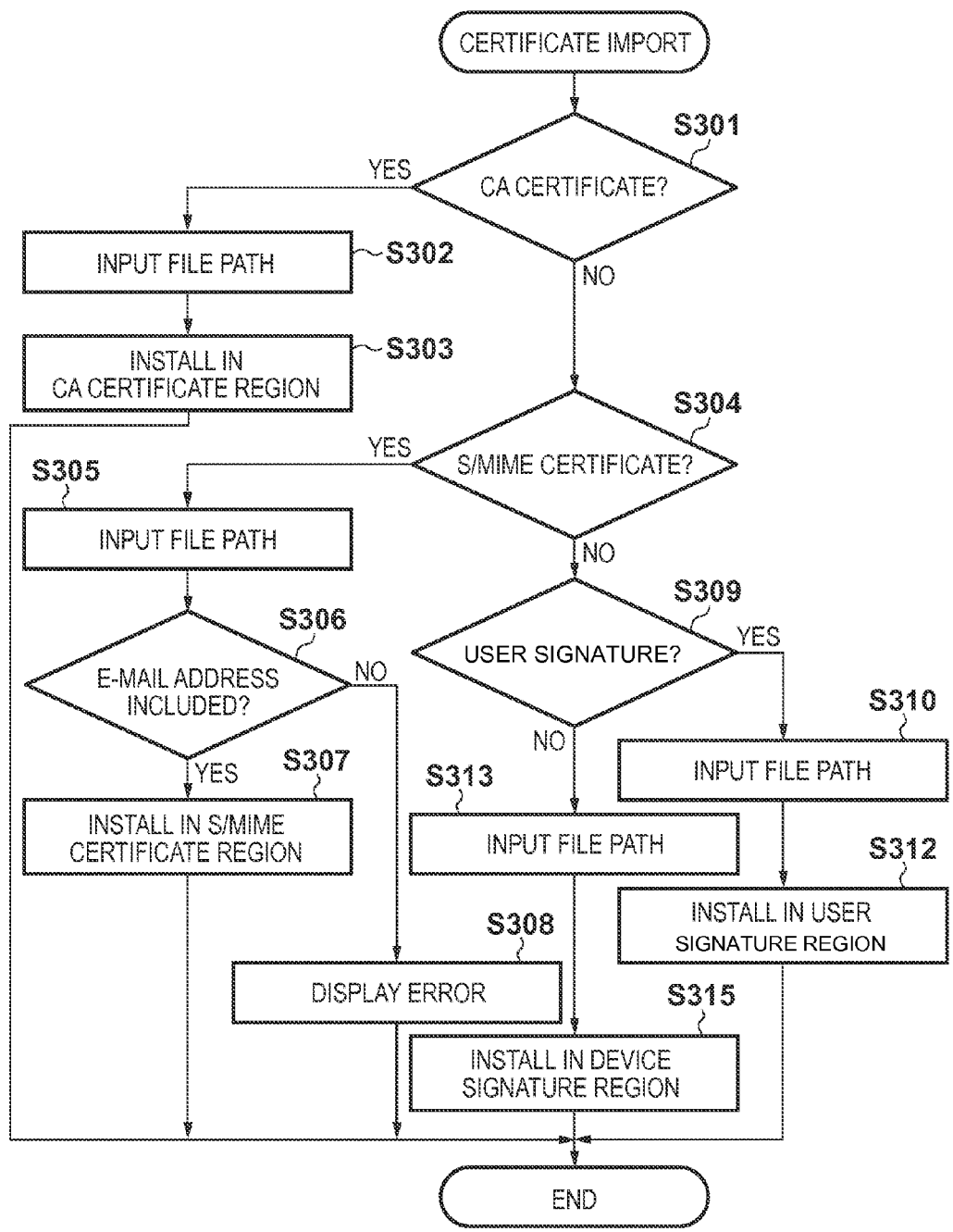
FIG. 8 is a flowchart for describing certificate import processing performed by the MFP when an import button on any of the screens of the PC illustrated in FIGS. 4 to 7 has been clicked.

FIG. 8 is a flowchart for describing certificate import processing performed by the MFP 100 when one of the import buttons 221, 231, 241, and 251 on the screens of the PC 103 shown in FIGS. 4 to 7 is clicked. Note that a program that executes this processing is stored in the ROM 131 and, by the CPU 130 executing this program, the processing is achieved.

First, in step S301, the CPU 130 determines whether the import button 241 (FIG. 6) for importing a CA certificate is instructed (clicked), and if it is instructed, the procedure advances to step S302, where the CPU 130 allows a user to input a path of the certificate that is to be imported. Then, the procedure advances to step S303, where the CA certificate is installed in a CA certificate region of the hard disk 137, and the procedure ends.

On the other hand, if the import button 241 for importing the CA certificate is not instructed in step S301, the procedure advances to step S304, where the CPU 130 determines whether the import button 251 (FIG. 7) for importing an S/MIME certificate is instructed. If it is instructed, the procedure advances to step S305, where the CPU 130 allows the user to input a path of the certificate that is to be imported. Next, the procedure advances to step S306, where the CPU 130 reads the certificate based on the path that was input in step S305, and determines whether this certificate includes an e-mail address. Here, if it is determined that the certificate does not include an e-mail address, the procedure advances to step S308, where the CPU 130 determines that use of this certificate as an S/MIME certificate is not appropriate and displays an error as an import error, and the processing ends. On the other hand, if it is determined in step S306 that the certificate includes an e-mail address, the procedure advances to step S307, where the CPU 130 installs the S/MIME certificate in an S/MIME region of the hard disk 137, and the processing ends.

If the import button 251 for importing an S/MIME certificate is not instructed in step S304, the procedure advances to step S309, where the CPU 130 determines whether the import button 221 (FIG. 4) for importing a user signature is instructed. If it is instructed, the procedure advances to step S310, where the CPU 130 allows the user to input a path of the certificate that is to be imported. Then, the procedure advances to step S312, where the CPU 130 installs the user signature in a user signature region of the hard disk 137.

On the other hand, if the user signature is not instructed to be imported in step S309, this situation may indicate that the import button 231 (FIG. 5) for importing a device signature is instructed, and thus the procedure advances to step S313, where the CPU 130 allows the user to input a path of the certificate in which the device signature is to be imported. Then, the procedure advances to step S315, where the CPU 130 installs the device signature in a device signature storage area of the hard disk 137, and the processing ends.

Figure 9A:
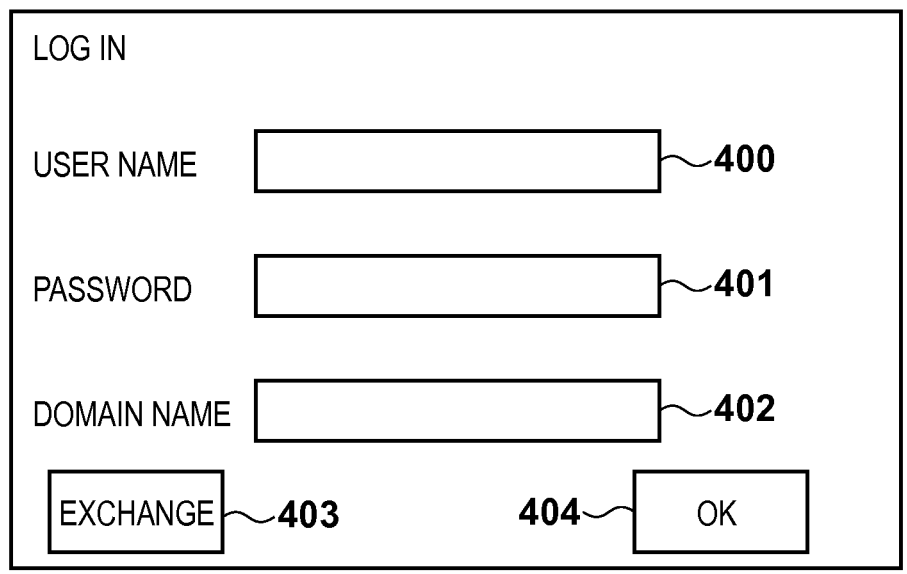
FIGS. 9A and 9B are diagrams illustrating examples of screens on the MFP that are for performing user authentication according to the first embodiment.
Figure 9B:
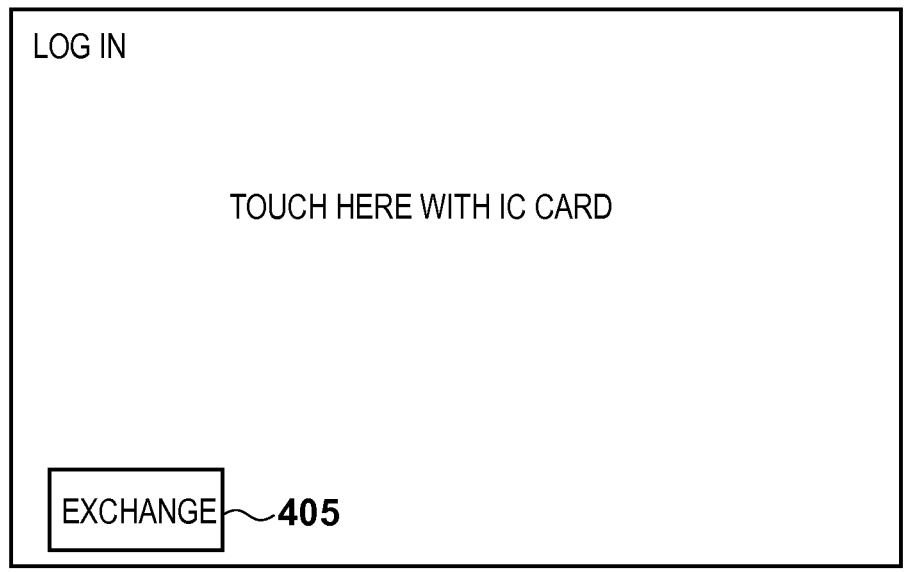

FIGS. 9A and 9B are diagrams illustrating examples of screens on the MFP 100 that are for performing user authentication according to the first embodiment.

FIG. 9A shows an example of the screen on which the user is caused to input a user name, a domain name, and a password so that authentication is executed. When a user name 400, a password 401, and a domain name 402 on this screen are filled and an OK key 404 is pressed, the information is transmitted to the authentication server 104, and user authentication is performed. Here, if the user authentication is successful, the screen can shift to the next screen, whereas if an authentication error occurs, this screen remains as it is.

If an exchange button 403 on the screen of FIG. 9A is pressed, the screen shifts to an authentication screen of FIG. 9B on which authentication is performed using an IC card. If an exchange button 405 on the screen of FIG. 9B is pressed, the screen returns to the screen of FIG. 9A.

When the user touches the IC card 105 against the card reader 144 while the screen of FIG. 9B is being displayed, the card ID of the IC card 105 is read, the user is specified based on the card ID by the authentication server 104, and authentication of the user is performed. Here, if the authentication of the user is successful, the screen can shift to the next screen, whereas if an authentication error occurs, this screen remains as it is.

In the authentication server 104, e-mail addresses that are associated with respective users are registered, and if authentication of a user is successful, the e-mail address of the authenticated user is transmitted to the MFP 100.

Figure 10:
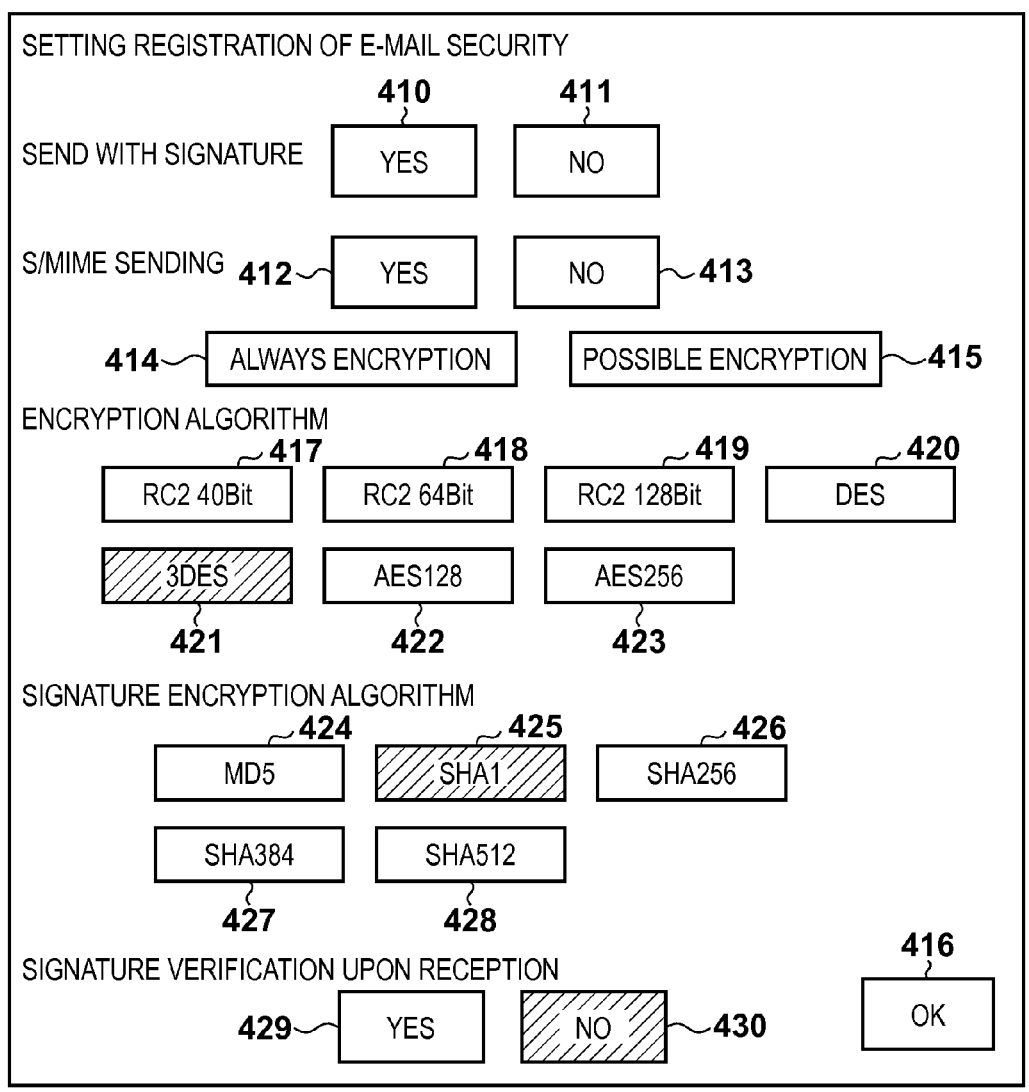
FIG. 10 is a diagram illustrating an example of a screen for an administrator who manages the MFP according to the first embodiment to set e-mail security items.

FIG. 10 is a diagram illustrating an example of a screen for an administrator who manages the MFP 100 according to the first embodiment to set e-mail security items.

At the time of e-mail transmission, a "Yes" button 410 is selected when an e-mail is sent with an electronic signature of the user, whereas a "No" button 411 is selected when an e-mail is sent without the electronic signature. Buttons 412 and 413 are buttons for selecting, at the time of e-mail transmission, whether to perform the transmission using data in an S/MIME format or to perform the transmission without using the data in the S/MIME format. If the "Yes" button 412 is selected, the transmission using S/MIME is performed, whereas if the "No" button 413 is selected, the transmission without using S/MIME is performed.

Note that, in the case of communication using S/MIME, since a signature is always added, if the "Yes" button 410 is not selected, the "Yes" button 412 for performing transmission using S/MIME is displayed in a grayed out state and cannot be selected, and the "No" button 413 is in the state of being selected.

If the "Yes" button 412 for performing transmission using S/MIME is selected, buttons 414 and 415 become selectable, whereas if the "No" button 413 for performing transmission without using S/MIME is selected, these buttons 414 and 415 are displayed in a gray out state and cannot be selected. Here, if it is always necessary to perform transmission of an e-mail that is encrypted using S/MIME, an "always encryption" button 414 is selected, and if transmission of the encrypted e-mail is not possible at that time, a send error is issued. On the other hand, if it is not always necessary to perform transmission of an encrypted e-mail, a "possible encryption" button 415 is selected. If this button 415 is selected, data of a non-encrypted plain text is sent to an address with respect to which encryption cannot be performed, whereas data encrypted using S/MIME is sent to an address with respect to which encryption can be performed.

Buttons 417 to 423 are each buttons for designating an encryption algorithm when an e-mail is to be encrypted and sent. Any one of an "RC2 40 Bit" 417, an "RC2 64 Bit" 418, an "RC2 128 Bit" 419, a "DES" 420, a "3DES" 421, an "AES128" 422, and an "AES256" 423 is selected. Note that the "3DES" 421 is selected as a default.

Buttons 424 to 428 are each buttons for designating an encryption algorithm of an electronic signature to be added. Any one of an "MD5" 424, a "SHA1" 425, a "SHA256" 426, a "SHA384" 427, and a "SHA512" 428 can be selected. The "SHA1" 425 is selected as a default.

A "Yes" button 429 for performing signature verification upon reception is a button for verifying an electronic signature upon receipt of an e-mail to which the signature is added, and for issuing an error if a problem that the expiration date of the signature has expired, a problem that the signature does not link to a reliable certificate authority, a problem that the signature is invalid, or the like is detected. If a "No" button 430 is set, such verification is not performed. An OK button 416 is a button for confirming these button settings.

Figure 11A:
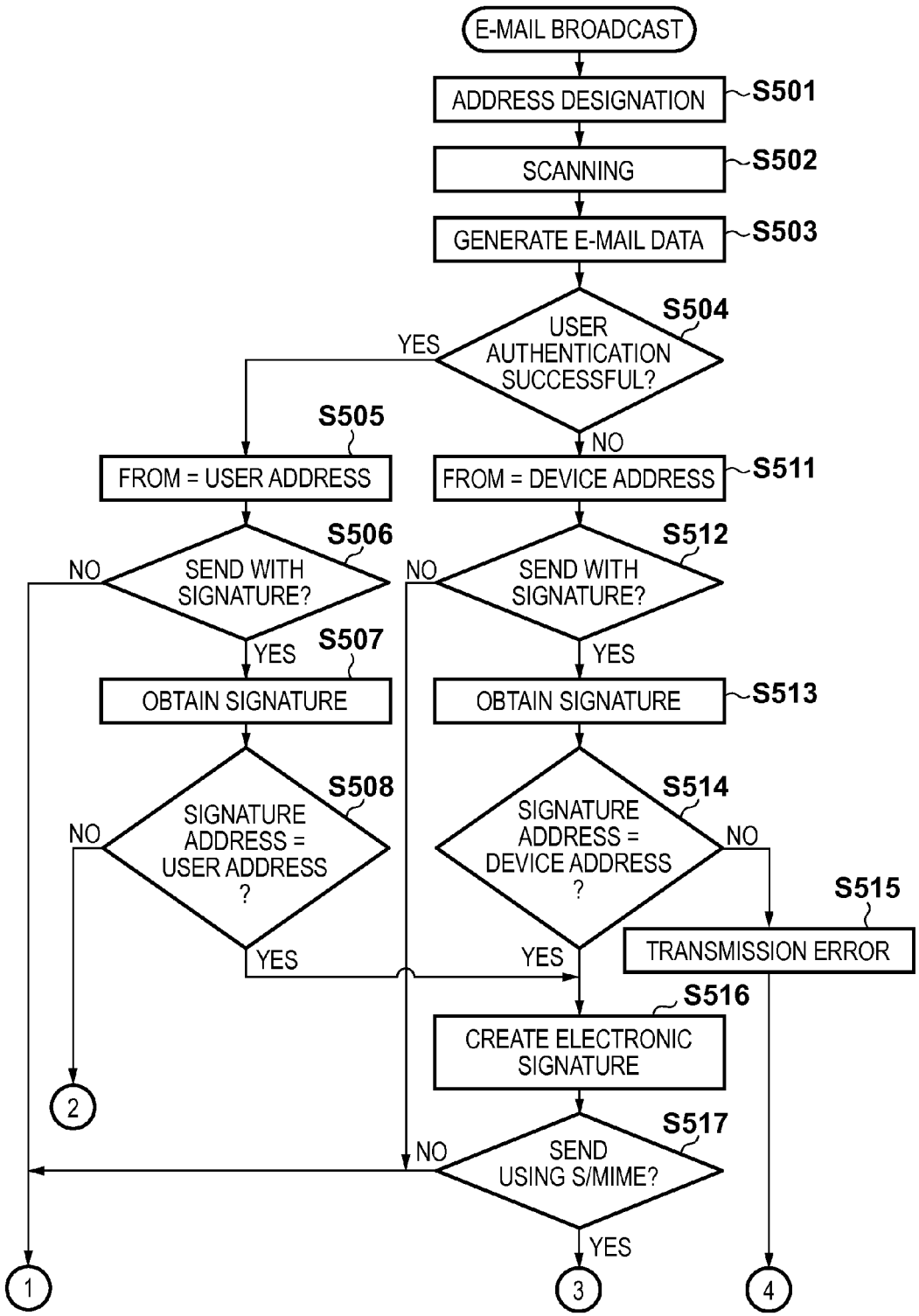
FIGS. 11A and 11B are flowcharts for describing processing in which the MFP according to the first embodiment broadcasts image data obtained by being read by a scanner to a plurality of e-mail destination addresses.
Figure 11B:
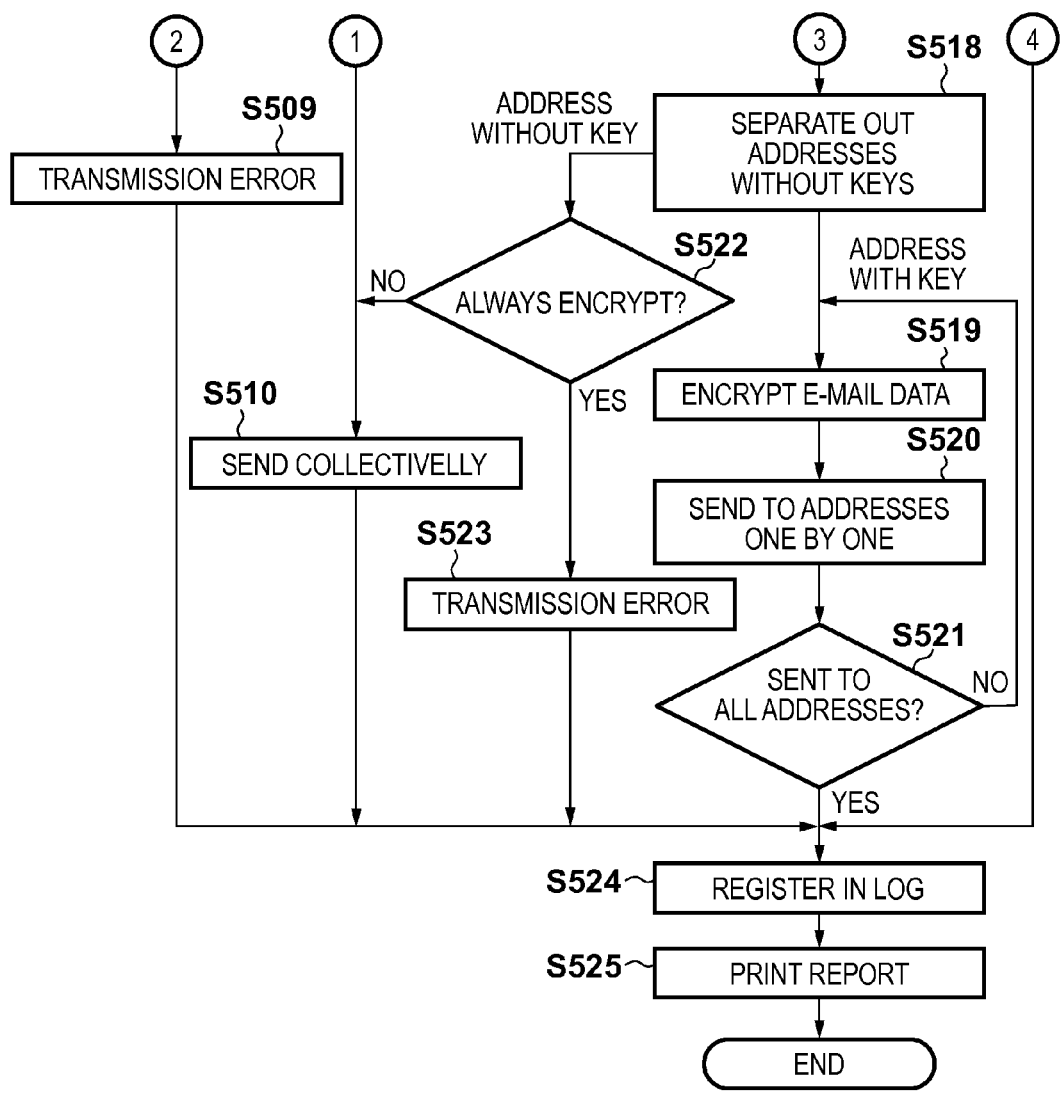

FIGS. 11A and 11B are flowcharts for describing processing in which the MFP 100 according to the first embodiment broadcasts image data in a predetermined file format, such as JPEG, PDF, or TIFF, that is obtained by being read by the scanner 134 to a plurality of e-mail destination addresses. Note that a program that executes this processing is stored in the ROM 131 and, by the CPU 130 executing this program, the processing is achieved.

First, in step S501, the CPU 130 receives a plurality of e-mail destination addresses designated through address designation, and the procedure advances to step S502, where the CPU 130 reads a document using the scanner 134. Next, the procedure advances to step S503, where the CPU 130 converts the image data obtained by being read into an image file in a format designated by the user, and attaches the image file to an e-mail so as to generate e-mail data.

Then, the procedure advances to step S504, where the CPU 130 determines whether or not user authentication described with reference to FIGS. 9A and 9B is successful, and if the user authentication is successful, the procedure advances to step S505, whereas if otherwise, the procedure advances to step S511. In step S505, the CPU 130 sets an e-mail address of the authenticated user that is notified by the authentication server 104 in "From" of the e-mail header. Next, the procedure advances to step S506, where the CPU 130 determines whether or not the "Yes" button 410 for sending the e-mail with a signature is selected on the screen of FIG. 10, and if it is selected, the procedure shifts to step S507. On the other hand, if it is not selected, the procedure advances to step S510 (FIG. 11B), where the e-mail is collectively sent to all the addresses designated in step S501, and the procedure advances to step S524.

In step S507, the CPU 130 searches for a certificate of the user who has logged in, from among the user signatures that are recorded in the hard disk 137 and illustrated with reference to FIG. 4, and obtains the corresponding user signature. Then, the procedure advances to step S508, where the CPU 130 determines whether or not an e-mail address that is recorded in the obtained signature matches the e-mail address of the authenticated user that is obtained from the authentication server 104 and set in the "From" address. If the addresses do not match each other in step S508, the procedure advances to step S509 (FIG. 11B), where a send error is issued since the e-mail address of the signature differs from the destination e-mail address. Then, the procedure advances to step S524, where the CPU 130 registers the error code, the destination address, the transmission start time, the transmission time period, and the transmission receipt number of this send error in a log. Further, the procedure advances to step S525, where the CPU 130 prints a transmission report that includes, in addition to the contents registered in the log, a reduced image of the first page read by the scanner 134.

Note that the log information registered in step S524 can be browsed as a sent e-mail list with the use of the console unit 133, and a plurality of transmission results can also be printed as a transmission management report.

On the other hand, if the e-mail addresses match each other in step S508, the procedure advances to step S516, where the CPU 130 encrypts the signature obtained in step S507 using the signature encryption algorithm that is selected from among the buttons 424 to 428 in FIG. 10, and generates an electronic signature, and then the procedure advances to step S517.

Whereas, if the user authentication is not successful in step S504, the procedure advances to step S511, where the CPU 130 sets an e-mail address of the device of the MFP 100 in a "From" field of the e-mail. Then, the procedure advances to step S512, where the CPU 130 determines whether or not the "Yes" button 410 for sending the e-mail with a signature (FIG. 10) is instructed, and if it is instructed, the procedure advances to step S513, whereas if otherwise, the procedure advances to step S510 (FIG. 11B), where the CPU 130 collectively sends the e-mail to all the addresses, and the procedure advances to step S524. In step S524, when the sending is completed, the error code, the destination addresses, the transmission start time, the transmission time period, and the transmission receipt numbers of the transmission result are registered in the log.

On the other hand, if the "Yes" button 410 for sending the e-mail with a signature is instructed in step S512, the procedure advances to step S513, where the CPU 130 obtains a device signature recoded in the hard disk 137 as with in step S507, and the procedure advances to step S514. In step S514, the CPU 130 determines whether or not an e-mail address that is recorded in the obtained signature matches the e-mail address of the device that is set in the "From" field of the e-mail in step S511. If the addresses do not match each other, the procedure advances to step S515, where a send error is issued since the e-mail address of the signature differs from the destination e-mail address, and the process advances to step S524 (FIG. 11B). Whereas, if the e-mail addresses match each other in step S514, the procedure advances to step S516, where the CPU 130 encrypts the signature obtained in step S513 using the signature encryption algorithm selected from among the buttons 424 to 428 in FIG. 10 and generates an electronic signature, and the procedure advances to step S517.

In step S517, the CPU 130 determines whether or not the "Yes" button 412 for performing transmission using S/MIME (FIG. 10) is selected. If the "No" button 413 is selected, the procedure advances to step S510 (FIG. 11B), where e-mail data is sent to all the addresses, and the procedure advances to step S524 (FIG. 11B). On the other hand, if the "Yes" button 412 for performing transmission using S/MIME is selected in step S517, the procedure advances to step S518 (FIG. 11B), where the CPU 130 performs processing for separating out addresses without keys. This processing is to check whether each of the plurality of e-mail addresses designated in step S501 is registered in any one of the S/MIME certificates illustrated with reference to FIG. 7, and to sort the addresses into a group of addresses that are not registered and a group of addresses that are registered.

Here, with respect to the group of addresses (without keys) that are not registered in the S/MIME certificates, the CPU 130 determines in step S522 whether or not the "always encryption" button 414 is selected. If it is selected, the procedure advances to step S523, where a send error is issued, and the procedure advances to step S524. In step S524, the error code indicating that encrypted transmission is not possible although the "always encryption" button 414 is set, the destination address, the transmission start time, the transmission time period, and the transmission receipt number are registered. Then, the procedure advances to step S525, where a transmission report is printed that includes, in addition to the contents registered in the log, a reduced image of the first page read by the scanner 134, and the processing ends. Note that operations are performed so that the transmission management report is automatically printed if, for example, 100 logs have accumulated without being printed. Also, if the "always encryption" button 414 is not selected in step S522, the procedure advances to step S510, where the CPU 130 collectively sends a plain text e-mail to all the addresses sorted as addresses without keys, and the procedure advances to step S524.

On the other hand, with respect to the group of addresses (addresses with keys) that are registered in the S/MIME certificates, the CPU 130 encrypts, in step S519, data of the e-mail to be sent to those addresses by a method selected from among the buttons 417 to 423 in FIG. 10. Then, when the encrypted e-mail data has been generated in step S519, the procedure advances to step S520, where the CPU 130 sends the e-mail data to the addresses one by one. Then, in step S521, determination is performed as to whether transmission of the e-mail to all the addresses of the group of addresses with keys is completed, and if the transmission is not completed, the procedure returns to step S519, where the e-mail data is transmitted to the next address. When the transmission of the e-mail data to all the addresses of the group of addresses with keys is completed in such a manner, the procedure advances to step S524, where information indicating that the e-mail was normally transmitted, the destination addresses, the transmission start time, the transmission time period, and the transmission receipt numbers are registered as log information.

Figure 18:
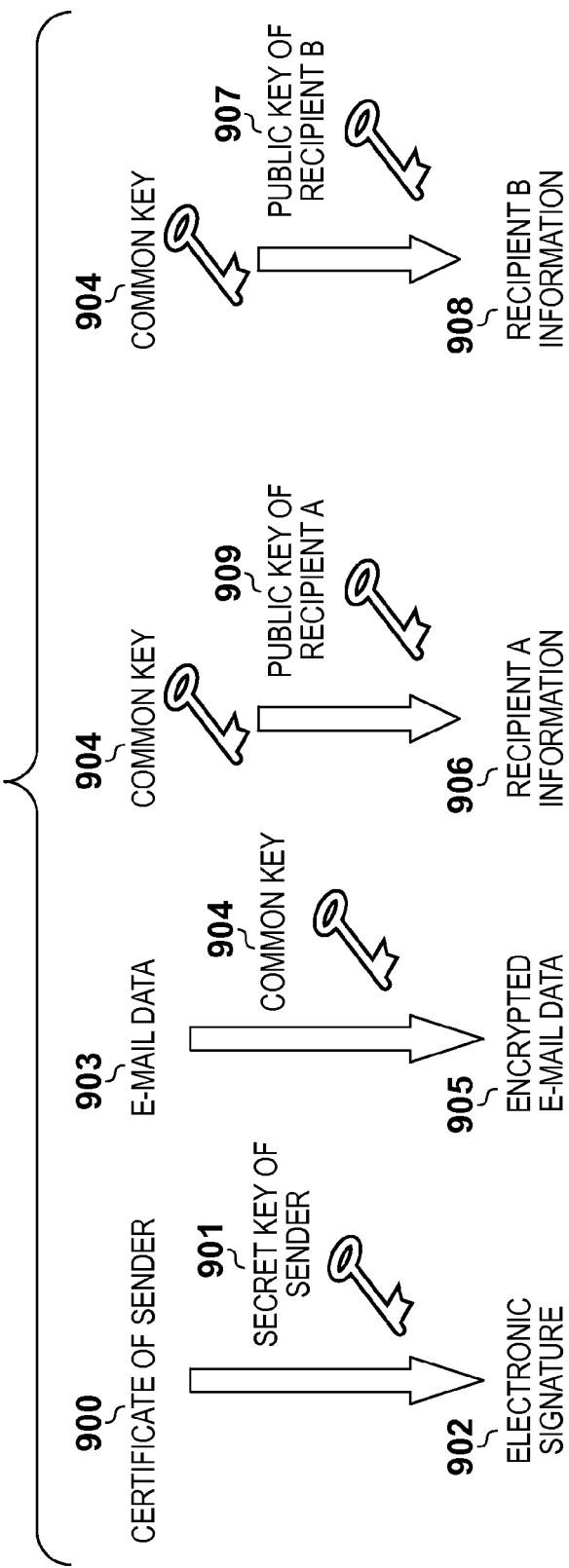
FIG. 18 is a diagram illustrating a conventional technology for broadcasting one e-mail to two addresses.

As such, according to the first embodiment, when broadcasting one e-mail to a plurality of addresses, e-mail data encrypted using S/MIME is sent to the addresses one by one. Therefore, there is only one piece of recipient information for decrypting codes, unlike the recipient A information 906 and the recipient B information 908 of the conventional technology that was described with reference to FIG. 18. Therefore, even if an e-mail is sent to a plurality of addresses as Bcc, other users are not informed of that the e-mail is sent as Bcc.

Figure 12A:
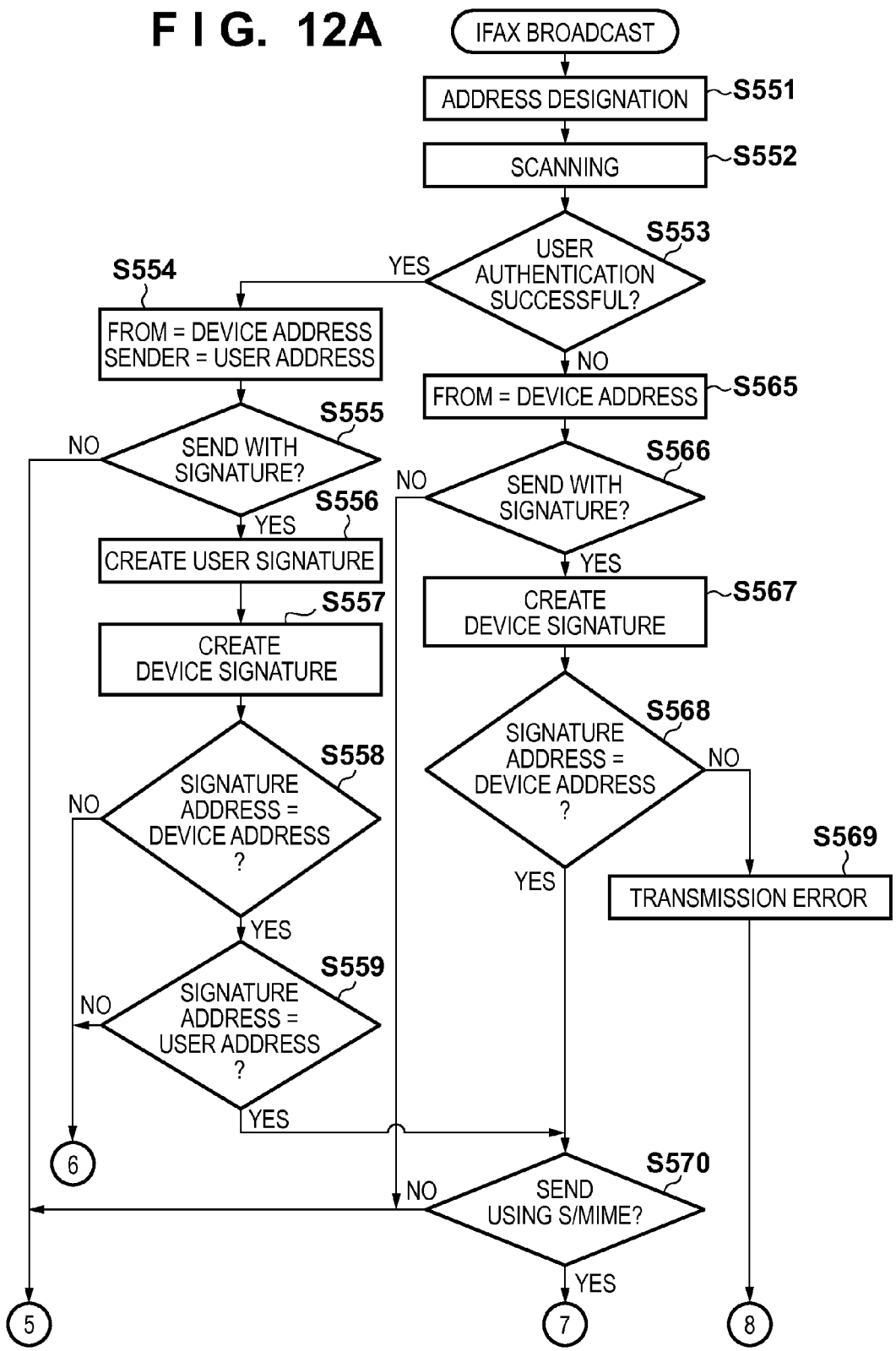
FIGS. 12A and 12B are flowcharts for describing processing in which the MFP according to the first embodiment broadcasts image data obtained by being read by a single read operation of the scanner to a plurality of IFAX destination addresses.
Figure 12B:
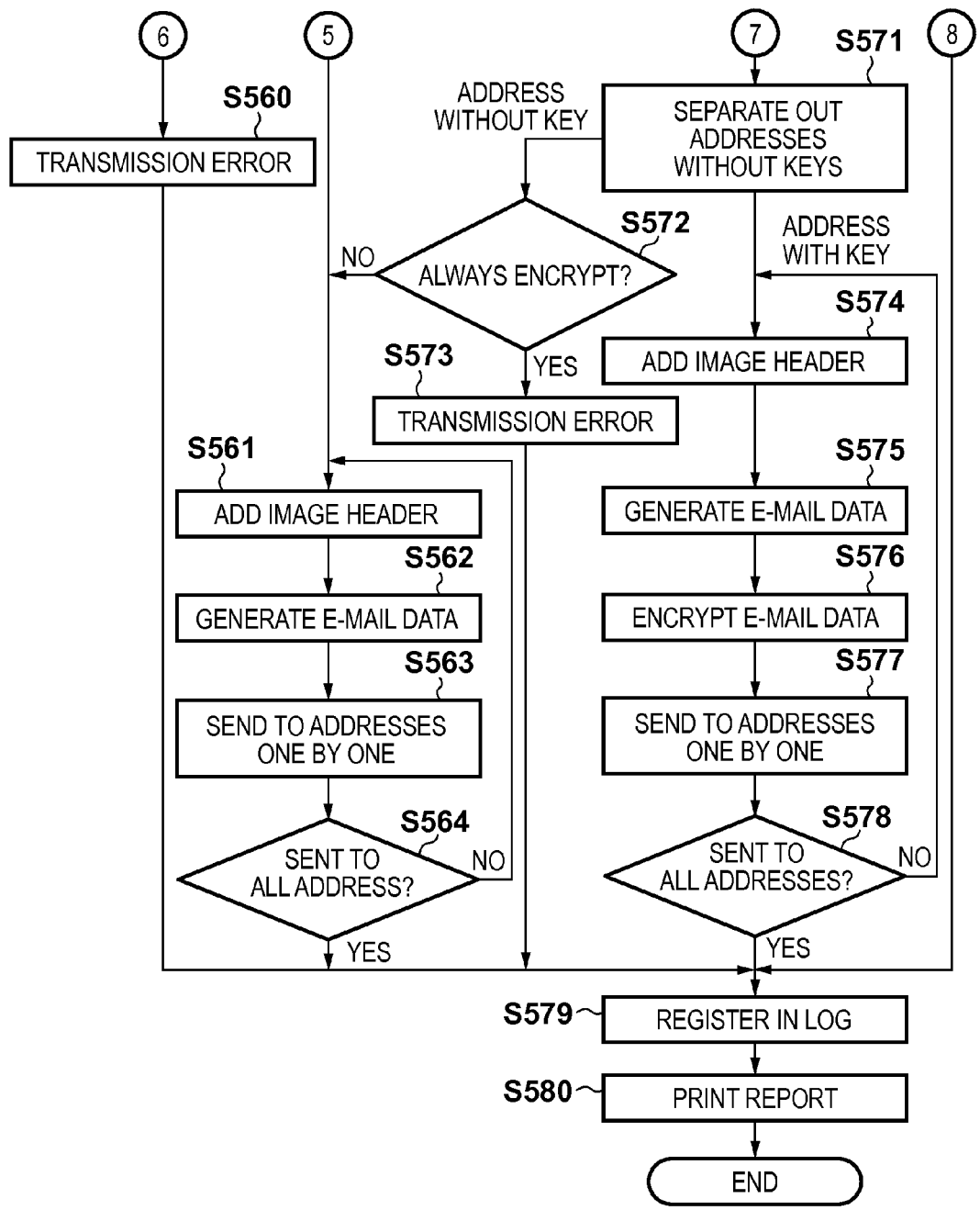

FIGS. 12A and 12B are flowcharts for describing processing in which the MFP 100 according to the first embodiment broadcasts image data obtained by a single read operation by the scanner 134 to a plurality of IFAX destination addresses. Note that a program that executes this processing is stored in the ROM 131 and, by the CPU 130 executing this program, the processing is achieved.

First, in step S551, the CPU 130 receives a plurality of IFAX destination addresses designated by the user, as designated addresses. Then, the procedure advances to step S552, where the CPU 130 reads an image of a document using the scanner 134, and generates image data. Then, the procedure advances to step S553, where the CPU 130 determines whether or not the user authentication described with reference to FIG. 9A and FIG. 9B is successful. If the user is authenticated, the processing advances to step S554, whereas if the user is not authenticated, the procedure shifts to step S565. In the case where the user is authenticated, in step S554, an e-mail address set for the MFP 100 is set in the "From" field of the e-mail, and an e-mail address of the authenticated user that is notified by the authentication server 104 is set in the "Sender" field. Then, the procedure advances to step S555, where the CPU 130 determines whether or not the "Yes" button 410 for sending the e-mail with a signature (FIG. 10) is selected, and if the "Yes" button 410 is selected, the procedure advances to step S556, whereas if the "No" button 411 is selected, the procedure shifts to step S561 (FIG. 12B). In step S561, the CPU 130 adds, as an image header image, the information on the destination address, the e-mail address of the MFP 100, an address abbreviation, the transmission start time, and the page number to the upper portion of the image scanned by the scanner 134. Then, the procedure advances to step S562, where the CPU 130 generates e-mail data based on the image data generated in step S552. Then, the procedure advances to step S563, where the CPU 130 sends this e-mail data to the addresses one by one. Then, in step S564, it is determined whether or not the transmission of the e-mail to all the addresses is completed, and if the transmission of the e-mail to all the addresses is not completed, the procedure returns to step S561, where e-mail data that is to be sent to the next address is generated and sent. When the transmission of the e-mail to all the addresses is completed in such a manner, the procedure advances to step S579.

On the other hand, if the "Yes" button 410 for sending the e-mail with a signature is selected in step S555, the procedure advances to step S556. In step S556, the CPU 130 searches for a certificate of the user who has logged in, from among the user signatures that are recorded in the hard disk 137 and illustrated with reference to FIG. 4, and obtains the corresponding user signature. Then, the user signature is encrypted in accordance with the signature encryption algorithm selected from among the buttons 424 to 428 of FIG. 10, and an electronic signature is created. Then, the procedure advances to step S557, and an electronic signature of the device signature illustrated with reference to FIG. 5 is generated. Then, the procedure advances to step S558, where the CPU 130 determines whether or not the e-mail address that is recorded in the device signature matches the device e-mail address set for the MFP 100. Here, if the e-mail addresses match each other, the procedure advances to step S559, whereas if otherwise, the procedure advances to step S560 (FIG. 12B), where a send error is issued. In step S559, the CPU 130 determines whether or not the e-mail address recorded in the obtained signature that corresponds to the user who has logged in matches the e-mail address of the authenticated user that is obtained from the authentication server 104 and set in the "Sender" field. If it is determined in step S559 that the e-mail addresses match each other, the procedure advances to step S570, whereas if otherwise, the procedure advances to step S560. In step S560 (FIG. 12B), the CPU 130 issues a send error since the e-mail address described in the signature differs from the destination e-mail address, and the procedure advances to step S579. In step S579, the CPU 130 registers the error code that corresponds to the error result, the destination address, the transmission start time, the transmission time period, and the transmission receipt number in a log. Then, the procedure advances to step S580, where in addition to the contents registered in the log, a reduced image of the first page read by the scanner 134 is added to a transmission report, and the transmission report is printed.

Note that the log information registered in step S579 can be browsed as a sent e-mail list with the use of the console unit 133, and a plurality of transmission results can also be printed as a transmission management report. The transmission management report is automatically printed if, for example, 100 logs have accumulated without being printed.

On the other hand, if it is determined in step S553 by the CPU 130 that the user is not authenticated, the procedure advances to step S565, and the CPU 130 sets a device e-mail address set for the MFP 100 in the "From" field of the e-mail. Then, the procedure advances to step S566, where the CPU 130 determines whether or not the "Yes" button 410 for sending the e-mail with a signature (FIG. 10) is selected, and if the "No" button 411 is selected, the procedure advances to the above-described step S561, where an image header of the destination address is created and added.

If, in step S566, the "Yes" button 410 for sending the e-mail with a signature is selected, the procedure advances to step S567, where the CPU 130 creates the device signature that is recorded in the hard disk 137 and illustrated with reference to FIG. 5. Next, the procedure advances to step S568, where the CPU 130 determines whether or not the e-mail address described in the obtained device signature matches the device e-mail address set for the MFP 100. Here, if it is determined that these addresses do not match each other, the procedure advances to step S569, where a send error is set, and the procedure advances to step S579 (FIG. 12B). In step S579, the CPU 130 registers the error code indicating that the e-mail address of the signature and the e-mail address to which the e-mail is to be sent do not match each other, the destination address, the transmission start time, the transmission time period, and the transmission receipt number in the log.

On the other hand, if in step S568 the e-mail address of the signature matches the e-mail address of the device, the procedure advances to step S570. In step S570, the CPU 130 determines whether or not the "Yes" button 412 for performing transmission using S/MIME is selected, and if the "Yes" button 412 is selected, the procedure advances to step S571 (FIG. 12B), whereas if otherwise, the procedure advances to the above-described step S561. In step S571, as with in the above-described step S518, the CPU 130 performs processing for separating addresses without keys. In this processing, the CPU 130 determines whether or not e-mail addresses of a plurality of IFAXs designated in step S551 are registered in the S/MIME certificates illustrated with reference to FIG. 7. With respect to the group of addresses (without keys) that are not registered, the procedure advances to step S572, and with respect to the group of addresses (with keys) that are registered, the procedure advances to step S574.

With respect to the group of addresses that are not registered in the S/MIME certificates, the CPU 130 determines in step S572 whether or not the "always encryption" button 414 of FIG. 10 is selected, and if the "always encryption" button 414 is selected, the procedure advances to step S573, where a send error is issued, and the procedure advances to step S579. In step S579, the error code indicating that encrypted transmission was not possible although the "always encryption" button 414 is set, the destination address, the transmission start time, the transmission time period, and the transmission receipt number are registered. Then, in step S580, in addition to the contents registered in the log, a reduced image of the first page read by the scanner 134 is added to a transmission report, and the transmission report is printed. Note that operations are performed so that a transmission management report is automatically printed if, for example, 100 logs have accumulated without being printed. Also, if the "always encryption" button 414 is not selected in step S572, the procedure advances to step S561, where the image header of the destination address is generated and added, as described above. Then, the procedure advances to step S562, where the CPU 130 generates e-mail data. Then, the procedure advances to step S563, where the CPU 130 sends this e-mail data to the addresses one by one, subjects all the addresses of the group of addresses without keys to this processing, and collectively sends a plain text e-mail to all the addresses that are sorted as the addresses without keys, and the procedure advances to step S579.

On the other hand, if, in step S571, the address is determined to be an address that is registered in the S/MIME certificate, the procedure advances to step S574. In step S574, the CPU 130 adds, as an image header image, the information on the destination address, the e-mail address of the MFP 100, the address abbreviation, the transmission start time, and the page number to the upper portion of the image data obtained by being read by the scanner 134. Then, the procedure advances to step S575, where the CPU 130 generates e-mail data based on this image data. Next, the procedure advances to step S576, where the CPU 130 encrypts this e-mail data using the encryption method selected from among the buttons 417 to 423 of FIG. 10. Then, the procedure advances to step S577, where the CPU 130 sends the generated data to the addresses one by one, and the procedure advances to step S578, where the CPU 130 confirms whether or not transmission to all addresses of the group of addresses with keys is completed. If the transmission is not completed, the procedure returns to step S574, where transmission to the next address is performed. When the transmission to all the addresses of the group of addresses with keys is completed in such a manner, the procedure advances to step S579, where the CPU 130 registers information indicating that the transmission was normally completed, the destination address, the transmission start time, the transmission time period, and the transmission receipt number in the log.

As such, according to the first embodiment, even in the case of broadcasting one e-mail to a plurality of IFAX destination addresses, only one piece of recipient information is present since e-mail data encrypted using S/MIME is sent to the addresses one by one. Therefore, different from the conventional technology illustrated in FIG. 18, it is not necessary to send recipient information for decrypting the codes of the recipient A information 906 and the recipient B information 908 and, even if the e-mail is sent to the plurality of addresses as Bcc, other users are not informed of that the e-mail was sent as Bcc.

FIG. 13 is a flowchart for describing processing in which the MFP 100 according to the first embodiment executes copy processing and, upon completion of this copy processing, sends a job completion notification via e-mail. Note that a program that executes this processing is stored in the ROM 131 and, by the CPU 130 executing this program, the processing is achieved.

This processing starts when this copy processing is instructed, and at first in step S601, the CPU 130 performs the user authentication illustrated with reference to FIG. 9. Next, the procedure advances to step S602, where the CPU 130 receives, on a screen of various types of copy settings (not shown), a message that shows turning ON of a job completion notification setting for notifying an e-mail address designated by the user of the completion of copying when the copy processing is completed. Note that this job completion notification setting is applicable to not only the copy processing but to any processing that requires time such as FAX transmission, PDL printing, and printing of a box text. Accordingly, in step S603, the CPU 130 executes the copy processing. In step S604, the CPU 130 confirms that the user has logged out. Note that this log-out processing is not necessarily performed after completion of the copy processing, and the user can log out any time after the copy processing has started. When the copy processing is thus completed, the procedure advances to step S605, where the CPU 130 starts processing for giving a notification of completion of the job.

In step S605, the CPU 130 creates an e-mail that includes a text indicating that printing of a copy is completed. Next, the procedure advances to step S606, where the CPU 130 sets the e-mail address set for the MFP 100 in the "From" field of this e-mail. Then, the procedure advances to step S607, where the CPU 130 determines whether the "Yes" button 410 for sending the e-mail with a signature (FIG. 10) is selected, and if it is selected, the procedure advance to step S608, whereas if the "No" button 411 is selected, the procedure advances to step S618. In step S618, the CPU 130 sends the created e-mail, and the procedure advances to step S619, where the CPU 130 registers the information indicating that the transmission was normally completed, the destination address, the transmission start time, the transmission time period, and the transmission receipt number in a log. Next, the procedure advances to step S620, where the CPU 130 prints the contents registered in step S619, and the processing ends.

On the other hand, if, in step S607, the "Yes" button 410 for sending the e-mail with a signature is selected, the procedure advances to step S608, where the device signature illustrated with reference to FIG. 5 is obtained. The job completion notification is an e-mail that is generally sent after the user has logged out, and the MFP 100 is responsible for the contents (completion of copying) of the e-mail. This is the reason why the device signature is used, instead of the signature of the user who has logged in.

Next, the procedure advances to step S609, where it is determined whether or not the e-mail address described in the device signature obtained in step S608 matches the device e-mail address to which the e-mail is to be sent, and if the e-mail addresses do not match each other, the procedure advances to step S610, where a send error is issued. The procedure further advances to step S619, where the CPU 130 registers the error code indicating that the e-mail address of the signature and the destination e-mail address do not match each other, the destination address, the transmission start time, the transmission time period, and the transmission receipt number in the log.

On the other hand, if, in step S609, the e-mail address of the signature and the destination e-mail address match each other, the procedure advances to step S611, where the CPU 130 encrypts the device signature using the signature cryptographic algorithm selected from among the buttons 424 to 428 of FIG. 10, and creates an electronic signature. Then, the procedure advances to step S612, where the CPU 130 determines whether the "Yes" button 412 for performing transmission using S/MIME (FIG. 10) is selected, and if the "No" button 413 is selected, the procedure advances to step S618, where a plain text e-mail is sent to the designated addresses, and the procedure advances to step S619. On the other hand, if the "Yes" button 412 for performing transmission using S/MIME is selected in step S612, the procedure advances to step S613, where the CPU 130 determines whether or not the address designated in step S602 as an address to which the job completion notification is to be sent is registered in any of the S/MIME certificates illustrated with reference to FIG. 7. Here, if it is determined that the address is not registered, the procedure advances to step S616, where it is determined whether the "always encryption" button 414 of FIG. 10 is selected. If the "always encryption" button 414 is selected, the procedure advances to step S617, where a send error is issued. Then, the procedure advances to step S619, where the CPU 130 registers the error code indicating that encryption was not possible although the "always encryption" button 414 is selected since the key is not registered, the destination address, the transmission start time, the transmission time period, and the transmission receipt number in the log.

If the "always encryption" button 414 is not selected in step S616, the procedure advances to step S618, where the CPU 130 sends a plain text e-mail with an electronic signature. Then, the procedure advances to step S619, where the CPU 130 registers the information indicating that the transmission was successful, the destination address, the transmission start time, the transmission time period, and the transmission receipt number in the log.

On the other hand, if the CPU 130 determines in step S613 that the address designated as an address to which the job completion notification is to be sent is registered in any of the S/MIME certificates, the procedure advances to step S614. In step S614, the CPU 130 encrypts the e-mail data using the encryption algorithm selected from among the buttons 417 to 423 in FIG. 10. And the procedure advances to step S615, where the CPU 130 sends the encrypted e-mail data to the designated address. Then, the procedure advances to step S619, where the CPU 130 registers information on the transmission result, the destination address, the transmission start time, the transmission time period, and the transmission receipt number in the log. And the procedure advances to step S620, where the CPU 130 prints a transmission report based on the contents registered in the log in step S619, and the processing ends.

FIG. 14 is a diagram illustrating an example of settings of a user box of the MFP 100 according to the first embodiment when image data obtained by being read by the scanner is stored in the user box.

This user box is divided into 100 boxes of numbers 00 to 99, and an e-mail address can be registered in each box.

In the case where a new document is registered in a box, an e-mail that includes a URL for a browser to open this document is sent to the e-mail address registered in that box. The user who has received this e-mail opens this e-mail and double clicks the URL described therein, thereby activating the browser. The document stored in this box can then be opened.

In FIG. 14, the e-mail address "yamada@abc.co.jp" is set in the box 00, and the e-mail address "tanaka@abc.co.jp" is set in the box 03. Here, if a new document is registered in the box 00, an e-mail that includes a URL for opening that document is sent to the e-mail address "yamada@abc.co.jp". Also, if a new document is registered in the box 03, an e-mail that includes a URL for opening that document is sent to the e-mail address "tanaka@abc.co.jp".

Figure 15:
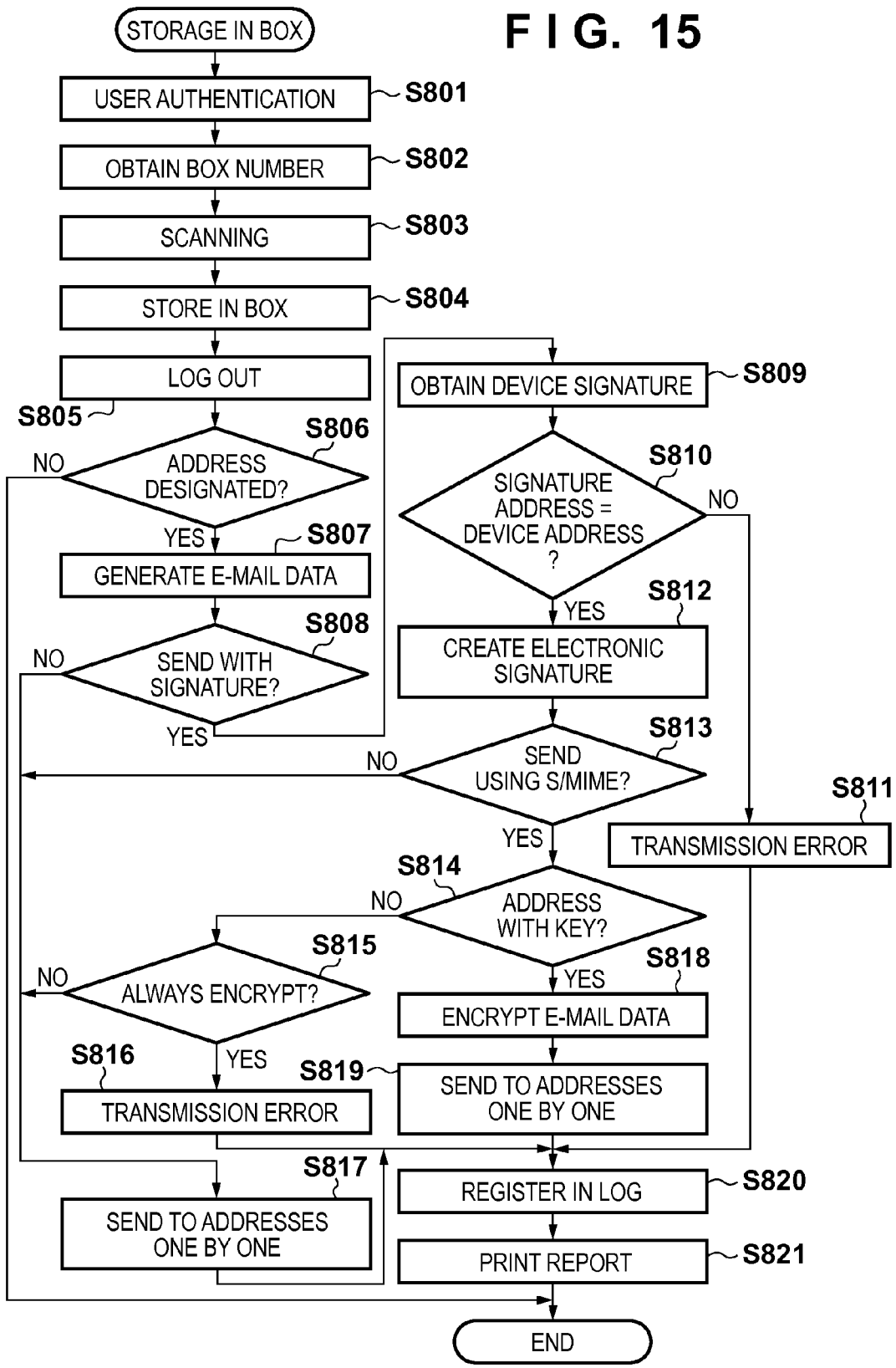
FIG. 15 is a flowchart for describing processing for sending, when a document is stored in the box of the MFP according to the first embodiment, a URL for opening this document.

FIG. 15 is a flowchart for describing processing for sending, when a document is stored in the box of the MFP 100 according to the first embodiment, a URL for opening the document. Note that a program that executes this processing is stored in the ROM 131 and, by the CPU 130 executing this program, the processing is achieved.

This processing starts when the user registers a document in a box. Assume that, at that time, the e-mail address "yamada@abc.co.jp" is already set in the box 00, and the e-mail address "tanaka@abc.co.jp" is already set in the box 03.

First, in step S801, the CPU 130 performs the user authentication illustrated with reference to FIGS. 9A and 9B. Then, the processing advances to step S802, where the CPU 130 receives the box number of a box that is input by the user and in which a document is to be stored. Then, the procedure advances to step S803, where the CPU 130 reads the document using the scanner 134 in response to a start button (not shown) of the console unit 133 being pressed, and generates image data of the document. Then, the procedure advances to step S804, where the CPU 130 stores the image data obtained by scanning in the designated box. Then, the procedure advances to step S805, where the CPU 130 accepts a logout operation of the user, and the procedure advances to step S806, where the CPU 130 starts processing for sending a URL for opening this document.

In the processing for sending a URL, at first in step S806, the CPU 130 determines whether or not an e-mail address is set in the box in which the image data is stored. Here, if no e-mail address is set, the processing ends. If it is determined in step S806 that an e-mail address is set in the box, the procedure advances to step S807, where the CPU 130 creates an e-mail that includes a URL of the image data stored in this box. Then, the procedure advances to step S808, where the CPU 130 determines whether or not the "Yes" button 410 for sending the e-mail with a signature (FIG. 10) is selected. Here, if the "No" button 411 is selected, the procedure advances to step S817, where the CPU 130 transmits the created plain text e-mail to the address described in this box. When the transmission thus ends, the procedure advances to step S820, where the CPU 130 registers the information on the URL transmission results, the destination address, the transmission start time, the transmission time period, and the transmission receipt number in a log. Then, the procedure advances to step S821, where the CPU 130 prints the content registered in step S820 as a report, and the processing ends.

On the other hand, if it is determined in step S808 by the CPU 130 that the "Yes" button 410 for sending the e-mail with a signature is selected, the procedure advances to step S809. In step S809, the CPU 130 obtains a device signature illustrated with reference to FIG. 5. Then, the procedure advances to step S810, where the CPU 130 determines whether or not the e-mail address recorded in the device signature and the device e-mail address set for the MFP 100 match each other. If the addresses do not match each other, the procedure advances to step S811, where the CPU 130 issues a send error, and the procedure advances step S820. In step S820, the CPU 130 registers the error code indicating that the e-mail address of the signature and the device e-mail address do not match each other, the destination address, the transmission start time, the transmission time period, and the transmission receipt number in the log, and the procedure advances to step S821.

On the other hand, if it is determined in step S810 that the e-mail address of the signature and the device e-mail address match each other, the procedure advances to step S812, where the CPU 130 encrypts the device signature in accordance with the signature encryption algorithm selected from among the buttons 424 to 428 in FIG. 10, and generates an electronic signature, and the procedure advances to step S813.

Note here that the destination address to which a URL is transmitted is an e-mail address registered in a box, and there is a possibility that this address is set not by the user who has logged in but by another user. Since generation of a URL that is most important in the URL transmission is performed by the MFP 100, a device signature is used, instead of the signature of the user who has logged in.

In step S813, the CPU 130 determines whether or not the "Yes" button 412 for performing transmission using S/MIME (FIG. 10) is selected, and if the "No" button 413 is selected, the procedure advances to step S817, where a plain text e-mail with that signature is sent. After the transmission of the e-mail is normally ended in step S817, the procedure advances to step S820, where the CPU 130 registers information indicating that the e-mail was normally transmitted, the destination addresses, the transmission start time, the transmission time period, and the transmission receipt numbers in the log, and the procedure advances to step S821.

On the other hand, if it is determined in step S813 by the CPU 130 that the "Yes" button 412 for performing transmission using S/MIME is selected, the procedure advances to step S814, where the CPU 130 determines whether or not the e-mail address registered in this box is registered in any of the S/MIME certificates illustrated with reference to FIG. 7. Here, if it is determined that the e-mail address is not registered, the procedure advances to step S815, where the CPU 130 determines whether or not the "always encryption" button 414 is selected. If it is selected, the procedure advances to step S816, where a send error is issued, and the procedure advances to step S820. In step S820, the CPU 130 registers the error code indicating that encryption was not possible although the "always encryption" button 414 is selected since the key is not registered, the destination address, the transmission start time, the transmission time period, and the transmission receipt number in the log, and the procedure advances to step S821. If the "always encryption" button 414 is not selected in step S815, the procedure advances to step S817, where a plain text e-mail with that signature is sent.

Also, if it is determined in step S814 by the CPU 130 that the address designated as an address to which the job completion notification is to be sent is registered in any of the S/MIME certificates, the procedure advances to step S818, where the CPU 130 encrypts e-mail data using the encryption algorithm selected from among the buttons 417 to 423 of FIG. 10. Then, the procedure advances to step S819, where the CPU 130 transmits this encrypted data to the designated address. Further, the procedure advances to step S820, where the CPU 130 registers the information on the transmission results, the destination address, the transmission start time, the transmission time period, and the transmission receipt number in the log. Then, the procedure advances to step S821, where the CPU 130 prints the contents registered in the log as a transmission report.

Thereby, even if a URL for opening a document is sent via an e-mail when the document is stored in a box, it is possible to encrypt the e-mail with S/MIME and send it.

As described above, according to the first embodiment, even in the case where multi-address transmission is performed in an environment including both addresses that support S/MIME and addresses that do not support S/MIME, it is possible to efficiently ensure security without lowering the operability.

Also, even if an e-mail is broadcast to destination addresses using Bcc, the destination addresses are not notified of the addresses to which the e-mail is broadcast, thus allowing improvement in security. Also, by transmitting an e-mail to which a certificate of a user who is responsible for the transmission and a device certificate are attached, the effect of being able to improve security is achieved.

Second Embodiment

Figure 16:
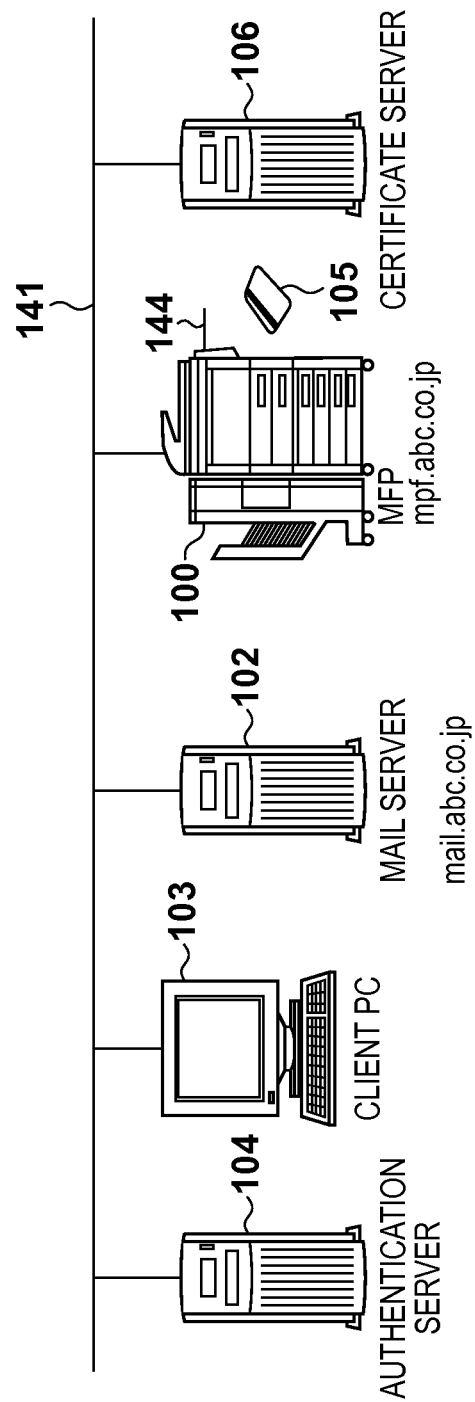
FIG. 16 is a diagram illustrating a configuration of an image communication system that includes a multi function peripheral (MFP) according to a second embodiment of the present invention.

FIG. 16 is a diagram illustrating a configuration of an image communication system that includes a multi function peripheral (MFP) according to a second embodiment of the present invention. Note that the same reference numerals are given to the components common to those in FIG. 1 according to the above-described first embodiment, and descriptions thereof are omitted. In the above-described first embodiment, as illustrated in FIG. 7, a certificate of a destination address is encrypted using an S/MIME certificate within the MFP 100. In this case, if a plurality of MFPs are provided, certificates need to be managed for each MFP. The client PC 103 also needs to manage certificates for each MFP, thus hindering promulgation of S/MIME.

In order to solve this problem, in the second embodiment, a certificate server 106 is additionally provided. This certificate server 106 manages the certificates, and operates so as to execute S/MIME communication using Server-Based Certificate Validation Protocol (SCVP) defined by RFC 5055.

Figure 17:
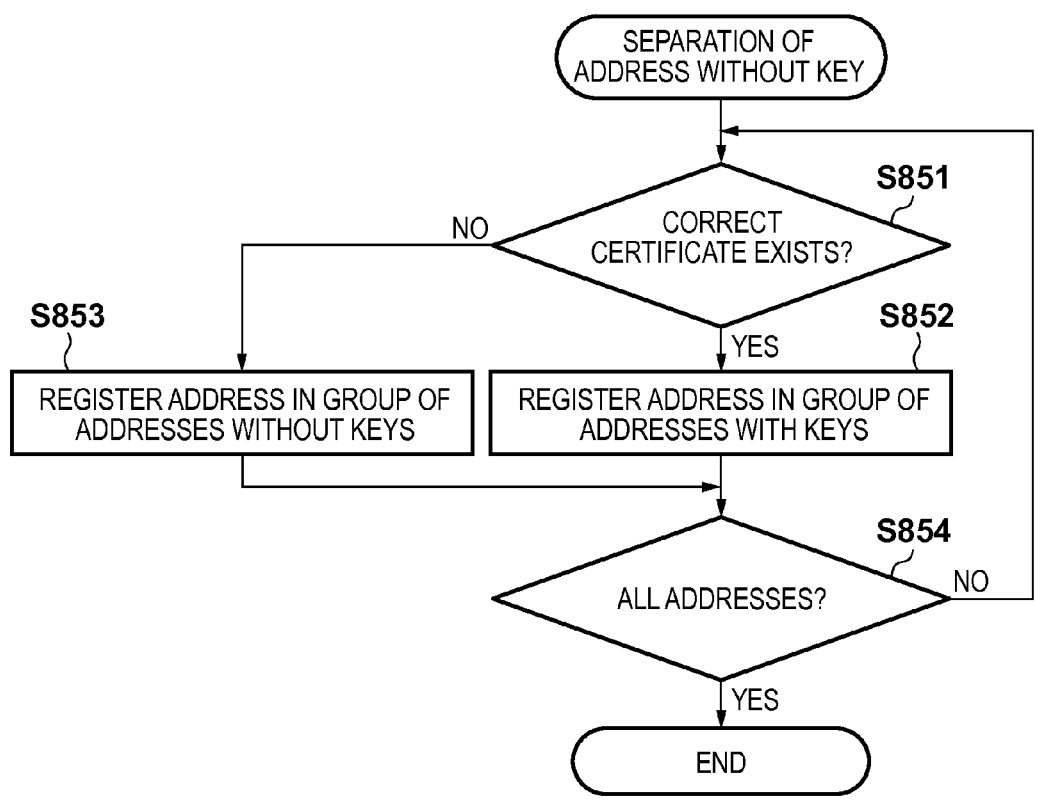
FIG. 17 is a flowchart for describing processing in which the MFP according to the second embodiment confirm with a certificate server using the SCVP whether or not a certificate designated by an e-mail address exists as a correct certificate.

FIG. 17 is a flowchart for describing processing in which the MFP 100 according to the second embodiment confirms with the certificate server 106 using the SCVP whether or not a certificate designated by an e-mail address exists as a correct certificate. Note that a program that executes this processing is stored in the ROM 131 and, by the CPU 130 executing this program, the processing is achieved.

When this processing for separating addresses without keys is started, first in step S851, the CPU 130 confirms with the certificate server 106 using the SCVP whether or not a certificate designated by an e-mail address exists as a correct certificate. Here, if it can be confirmed that the correct certificate exists, the procedure advances to step S852, where the CPU 130 registers the address as an address with a key, and the procedure advances to step S854. On the other hand, if it is determined that a correct certificate does not exist, the procedure advances to step S853, where the CPU 130 registers the address as an address without a key, the procedure advances to step S854. In step S854, the CPU 130 determines whether or not all the addresses to which broadcasting is instructed have been sorted, and if not all the addresses have been sorted, the procedure returns to step S851, where the processing is executed with respect to the next address, whereas if all the addresses have been sorted in step S854, the processing ends.

As described above, according to the second embodiment, providing the certificate server 106 eliminates the need for the MFP or the PC to manage certificates, and thus the management of certificates can easily be executed even when a plurality of MFPs or PCs are used.

Other Embodiment

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-269784, filed Dec. 10, 2012, which is hereby incorporated by reference herein in its entirety.

What is claimed is:

1. A communication apparatus comprising:
a designation unit configured to designate whether to perform encrypted transmission or plain text transmission for a broadcast of an e-mail to a plurality of destination addresses;
a setting unit configured to set, in a case that it is designated by the designation unit to perform the encrypted transmission for the broadcast, whether not to perform transmission to a destination address of the email, with respect to which the encrypted transmission is not possible, or to perform the plain text transmission to the destination address of the e-mail, with respect to which the encrypted transmission is not possible;
a transmission unit configured to control:
(i) to individually perform the encrypted transmission of the e-mail to each destination address of the plurality of destination addresses, with respect to which the encrypted transmission is possible,
(ii) in a case that the setting unit sets not to perform transmission to a destination address of the e-mail, with respect to which the encrypted transmission is not possible, not to perform transmission of the e-mail to the destination address, with respect to which the encrypted transmission is not possible, and
(iii) in a case that the setting unit sets to perform the plain text transmission to a destination address of the e-mail, with respect to which the encrypted transmission is not possible, to collectively perform the plain text transmission of the e-mail to a plurality of destination addresses, with respect to which the encrypted transmission is not possible, of the plurality of destination addresses of the broadcast,
wherein the designation unit, the setting unit, and the transmission unit are implemented by a processor and a memory.

2. The communication apparatus according to claim 1, further comprising
a reading unit that reads an image on a document and generates image data,
wherein the transmission unit transmits the e-mail to which the image data generated by the reading unit is attached.

3. The communication apparatus according to claim 1, further comprising
an encryption unit configured to encrypt, according to S/MIME, the e-mail to be sent in the encrypted transmission, and
wherein the encryption unit is implemented by the processor and the memory.

4. The communication apparatus according to claim 1, further comprising
a management unit configured to manage a public key for each destination address, wherein the transmission unit determines that the destination address of the e-mail is a destination address with respect to which the encrypted transmission is possible if the public key of the destination address is managed by the management unit, and determines that the destination address of the e-mail is not a destination address with respect to which the encrypted transmission is possible if the public key of the destination address is not managed by the management unit, wherein the management unit is implemented by the processor and the memory.

5. A communication apparatus comprising:
a designation unit configured to designate whether to perform encrypted transmission or plain text transmission for a broadcast of an e-mail to a plurality of destination addresses;
a management unit configured to manage a public key for each destination address;
a setting unit configured to set, in a case that it is designated by the designation unit to perform the encrypted transmission for the broadcast, whether not to perform transmission to a destination address of the email whose public key is not managed by the management unit or to perform the plain text transmission to the destination address of the e-mail whose public key is not managed by the management unit; and
a transmission unit configured to:
(i) individually perform the encrypted transmission of the e-mail to each destination address of the plurality of destination addresses, whose public key is managed by the management unit,
(ii) in a case that the setting unit sets not to perform transmission to a destination address of the e-mail, whose public key is not managed by the management unit, not to perform transmission of the e-mail to the destination address whose public key is not managed by the management unit, and
(iii) in a case that the setting unit sets to perform the plain text transmission to a destination address of the e-mail, whose public key is not managed by the management unit, to collectively perform the plain text transmission to a plurality of destination addresses of the email, whose public key is not managed by the management unit, of the plurality of destination addresses of the broadcast,
wherein the designation unit, the management unit, the setting unit, and the transmission unit are implemented by a processor and a memory.

6. The communication apparatus according to claim 5, further comprising
a reading unit that reads an image on a document and generates image data,
wherein the transmission unit transmits the e-mail to which the image data generated by the reading unit is attached.

7. The communication apparatus according to claim 5, further comprising
an encryption unit configured to encrypt, according to S/MIME, the e-mail to be sent in the encrypted transmission
wherein the encryption unit is implemented by the processor and the memory.

8. A method of controlling a communication apparatus, comprising:
designating whether to perform encrypted transmission or plain text transmission for a broadcast of an e-mail to a plurality of destination addresses;
setting, in case that it is designated in the designating to perform the encrypted transmission for the broadcast, whether not to perform transmission to a destination address of the e-mail, with respect to which the encrypted transmission is not possible, or to perform the plain text transmission to the destination address of the e-mail, with respect to which the encrypted transmission is not possible;
individually performing the encrypted transmission of the e-mail to each destination address of the plurality of destination addresses, with respect to which the encrypted transmission is possible,
in a case that the setting sets not to perform transmission to a destination address of the e-mail, with respect to which the encrypted transmission is not possible, not performing transmission of the e-mail to the destination address, with respect to which the encrypted transmission is not possible, and
in a case that the setting sets to perform the plain text transmission to a destination address of the e-mail, with respect to which the encrypted transmission is not possible, collectively performing the plain text transmission of the e-mail to a plurality of destination addresses, with respect to which the encrypting transmission is not possible, of the plurality of destination addresses
wherein the method is implemented by a processor in conjunction with a memory.

9. A method of controlling a communication apparatus comprising:
designating whether to perform encrypted transmission or plain text transmission for a broadcast of an e-mail to a plurality of destination addresses;
managing a public key for each destination address;
setting, in a case that it is designated in the designating to perform the encrypted transmission for the broadcast, whether not to perform transmission to a destination address of the e-mail whose public key is not managed in the managing or to perform the plain text transmission to the destination address of the e-mail whose public key is not managed in the managing; and
individually performing the encrypted transmission of the e-mail to each destination address, whose public key is managed in the managing,
in a case that the setting sets not to perform transmission to a destination address of the e-mail, whose public key is not managed in the managing, not performing transmission of the e-mail to the destination address, whose public key is not managed in the managing, and
in a case that the setting sets to perform the plain text transmission to a destination address of the e-mail, whose public key is not managed in the managing, collectively performing the plain text transmission of the email to a plurality of destination addresses, whose public key is not managed in the managing, of the plurality of destination addresses of the broadcast,
wherein the method is implemented by a processor in conjunction with a memory.

10. A non-transitory computer readable storage medium storing a program for causing a computer to execute a method, the method comprising:
designating whether to perform encrypted transmission or plain text transmission for a broadcast of an e-mail to a plurality of destination addresses;
setting, in a case that it is designated in the designating to perform the encrypted transmission for the broadcast, whether not to perform transmission to a destination address of the e-mail, with respect to which the encrypted transmission is not possible, or to perform the plain text transmission to the destination address of the e-mail, with respect to which the encrypted transmission is not possible; and individually performing the encrypted transmission of the e-mail to each destination address of the plurality of destination addresses, with respect to which the encrypted transmission is possible, in a case that the setting sets not to perform transmission to a destination address of the e-mail, with respect to which the encrypted transmission is not possible, not performing transmission of the e-mail to the destination address, with respect to which the encrypted transmission is not possible, and in a case that the setting sets to perform the plain text transmission to a destination address of the e-mail, with respect to which the encrypted transmission is not possible, collectively performing the plain text transmission of the e-mail to a plurality of destination addresses, with respect to which the encrypted transmission is not possible, of the plurality of destination addresses.

11. A non-transitory computer readable storage medium storing a program for causing a computer to execute a method, the method:

designating whether to perform encrypted transmission or plain text transmission for a broadcast of an e-mail to a plurality of destination addresses;

managing a public key for each destination address;

setting, in a case that it is designated in the designating to perform the encrypted transmission for the broadcast, whether not to perform transmission to a destination address of the e-mail whose public key is not managed in the managing or to perform the plain text transmission to the destination address of the e-mail whose public key is not managed in the managing; and individually performing the encrypted transmission of the e-mail to each destination address, whose public key is managed in the managing, in a case that the setting sets not to perform transmission to a destination address of the e-mail, whose public key is not managed in the managing, not performing transmission of the e-mail to the destination address, whose public key is not managed in the managing, and in a case that the setting sets to perform the plain text transmission to a destination address of the e-mail, whose public key is not managed in the managing, collectively performing the plain text transmission of the e-mail to a plurality of destination addresses, whose public key is not managed in the managing, of the plurality of destination addresses of the broadcast.

* * * * *